(12) United States Patent
Strohm et al.

(10) Patent No.: US 12,502,159 B2
(45) Date of Patent: Dec. 23, 2025

(54) SYSTEMS AND METHODS FOR DETERMINING CELL CONTRACTILITY

(71) Applicant: THE GOVERNING COUNCIL OF THE UNIVERSITY OF TORONTO, Toronto (CA)

(72) Inventors: Eric Strohm, Mississauga (CA); Craig Simmons, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 1508 days.

(21) Appl. No.: 16/658,556

(22) Filed: Oct. 21, 2019

(65) Prior Publication Data
US 2020/0124723 A1    Apr. 23, 2020

Related U.S. Application Data

(60) Provisional application No. 62/748,742, filed on Oct. 22, 2018.

(51) Int. Cl.
| | |
|---|---|
| *A61B 8/00* | (2006.01) |
| *G01N 29/34* | (2006.01) |
| *G01N 29/38* | (2006.01) |
| *G01N 29/40* | (2006.01) |
| *G01N 29/44* | (2006.01) |
| *G01S 15/89* | (2006.01) |
| *G01S 7/52* | (2006.01) |

(52) U.S. Cl.
CPC ........... *A61B 8/485* (2013.01); *G01N 29/346* (2013.01); *G01N 29/38* (2013.01); *G01N 29/40* (2013.01); *G01N 29/44* (2013.01); *G01S 15/8906* (2013.01); *G01S 7/52036* (2013.01); *G01S 15/8956* (2013.01)

(58) Field of Classification Search
None
See application file for complete search history.

(56) References Cited

PUBLICATIONS

Tamura et al. "Changes in muscle stiffness during contraction recorded using ultrasonic waves" (1982), Nature, vol. 299: 631-633. (Year: 1982).*
Pasternak et al. "High-frequency ultrasound detection of cell death: Spectral differentiation of different forms of cell death in vitro" (2016), Oncoscience, vol. 3 (9-10): 275-287. (Year: 2016).*
Witte et al. "High Resoluation Ultrasound Imaging of Skeletal Muscle Dynamics and Effects of Fatigue" (2004), IEEE Ultrasonics Symposium, 764-767. (Year: 2004).*
D. Rajamohan et al., "Current status of drug screening and disease modelling in human pluripotent stem cells," Bioessays, vol. 35, No. 3, pp. 281-298, Mar. 2012.

(Continued)

*Primary Examiner* — Teresa E Knight
(74) *Attorney, Agent, or Firm* — Quarles & Brady LLP

(57) ABSTRACT

The present application provides systems and methods for measuring cell function or tissue function. More particularly, the present application provides systems and methods for determining cell or tissue contractility using ultrasound; systems and methods for measuring the effect an agent has on cell or tissue contractility using ultrasound; and systems and methods for determining material properties of a material using ultrasound.

18 Claims, 24 Drawing Sheets

(56) References Cited

PUBLICATIONS

K. H. Benam et al., "Engineered in Vitro Disease Models", Annual Review of Pathology: Mechanisms of Disease, vol. 10, No. 1, pp. 195-262, 2015.

E. Tzatzalos, O. J. Abilez, P. Shukla, and J. C. Wu, "Engineered heart tissues and induced pluripotent stem cells: Macro- and microstructures for disease modeling, drug screening, and translational studies," Advanced Drug Delivery Reviews, vol. 96, pp. 234-244, Jan. 2016.

J. Liu, N. Sun, M. A. Bruce, J. C. Wu, and M. J. Butte, "Atomic Force Mechanobiology of Pluripotent Stem Cell-Derived Cardiomyocytes," PLoS ONE, vol. 7, No. 5, p. e37559, 7 pages, May 2012.

A. Kajzar, C. M. Cesa, N. KirchgeBner, B. Hoffmann, and R. Merkel, "Toward Physiological Conditions for Cell Analyses: Forces of Heart Muscle Cells Suspended Between Elastic Micropillars," Biophysical Journal, vol. 94, No. 5, pp. 1854-1866, Mar. 2008.

K. Kim et al., "Calibrated micropost arrays for biomechanical characterisation of cardiomyocytes," IET Micro Nano Letters, vol. 6, No. 5, pp. 317-322, May 2011.

M. L. Rodriguez, B. T. Graham, L. M. Pabon, S. J. Han, C. E. Murry, and N. J. Sniadecki, "Measuring the Contractile Forces of Human Induced Pluripotent Stem Cell-Derived Cardiomyocytes With Arrays of Microposts," J Biomech Eng, vol. 136, No. 5, pp. 051005-051005, 10 pages, Apr. 2014.

K. M. Beussman, M. L. Rodriguez, A. Leonard, N. Taparia, C. R. Thompson, and N. J. Sniadecki, "Micropost arrays for measuring stem cell-derived cardiomyocyte contractility," Methods, vol. 94, pp. 43-50, Feb. 2016.

A. Grosberg, A. P. Nesmith, J. A. Goss, M. D. Brigham, M. L. McCain, and K. K. Parker, "Muscle on a chip: In vitro contractility assays for smooth and striated muscle," Journal of Pharmacological and Toxicological Methods, vol. 65, No. 3, pp. 126-135, May 2012.

A. W. Feinberg, A. Feigel, S. S. Shevkoplyas, S. Sheehy, G. M. Whitesides, and K. K. Parker, "Muscular Thin Films for Building Actuators and Powering Devices," Science, vol. 317, No. 5843, pp. 1366-1370, Sep. 2007.

S. P. Sheehy, F. Pasqualini, A. Grosberg, S. J. Park, Y. Aratyn-Schaus, and K. K. Parker, "Quality Metrics for Stem Cell-Derived Cardiac Myocytes," Stem Cell Reports, vol. 2, No. 3, pp. 282-294, Mar. 2014.

S. Hume, "Development of a Novel Device for High-throughput Screening of Cell Contraction," Master of Applied Science, Institute of Biomaterials and Biomedical Engineering, University of Toronto, 2014, 95 pages.

I. Banerjee et al., "Cyclic stretch of embryonic cardiomyocytes increases proliferation, growth, and expression while repressing Tgf-B signaling," Journal of Molecular and Cellular Cardiology, vol. 79, pp. 133-144, Feb. 2015.

L. MacQueen, O. Chebotarev, C. A. Simmons, and Y. Sun, "Miniaturized platform with on-chip strain sensors for compression testing of arrayed materials," Lab Chip, vol. 12, No. 20, pp. 4178-4184, Sep. 2012.

M. Ackers-Johnson, P. Y. Li, A. P. Holmes, S.-M. O'Brien, D. Pavlovic, and R. S. Foo, "A Simplified, Langendorff-Free Method for Concomitant Isolation of Viable Cardiac Myocytes and Nonmyocytes From the Adult Mouse Heart", Circulation Research, vol. 119, No. 8, pp. 909-920, Sep. 2016.

J. G. Jacot, J. C. Martin, and D. L. Hunt, "Mechanobiology of Cardiomyocyte Development," J Biomech, vol. 43, No. 1, p. 93-98, Jan. 2010.

Q. Tseng et al., "Spatial organization of the extracellular matrix regulates cell-cell junction positioning," Proc. Natl. Acad. Sci. U.S.A., vol. 109, No. 5, pp. 1506-1511, Jan. 2012.

"Traction Force Microscopy—ImageJ plugins by Qingzong Tseng." [Online]. Available: https://sites.google.com/site/qingzongtseng/tfm, 4 pages [Accessed: Oct. 14, 2018].

A. J. S. Ribeiro et al., "Contractility of single cardiomyocytes differentiated from pluripotent stem cells depends on physiological shape and substrate stiffness," PNAS, vol. 112, No. 41, pp. 12705-12710, Oct. 2015.

G. Lin, R. E. Palmer, K. S. J. Pister, and K. P. Roos, "Miniature heart cell force transducer system implemented in MEMS technology," IEEE Transactions on Biomedical Engineering, vol. 48, No. 9, pp. 996-1006, Sep. 2001.

S.-I. Yasuda et al., "A novel method to study contraction characteristics of a single cardiac myocyte using carbon fibers," American Journal of Physiology—Heart and Circulatory Physiology, vol. 281, No. 3, pp. H1442-H1446, Sep. 2001.

S. Nishimura et al., "Single cell mechanics of rat cardiomyocytes under isometric, unloaded, and physiologically loaded conditions," American Journal of Physiology—Heart and Circulatory Physiology, vol. 287, No. 1, pp. H196-H202, Jul. 2004.

S. Yin, X. Zhang, C. Zhan, J. Wu, J. Xu, and J. Cheung, "Measuring Single Cardiac Myocyte Contractile Force via Moving a Magnetic Bead," Biophysical Journal, vol. 88, No. 2, pp. 1489-1495, Feb. 2005.

G. Iribe, M. Helmes, and P. Kohl, "Force-length relations in isolated intact cardiomyocytes subjected to dynamic changes in mechanical load," American Journal of Physiology—Heart and Circulatory Physiology, vol. 292, No. 3, pp. H1487-H1497, Mar. 2007.

* cited by examiner

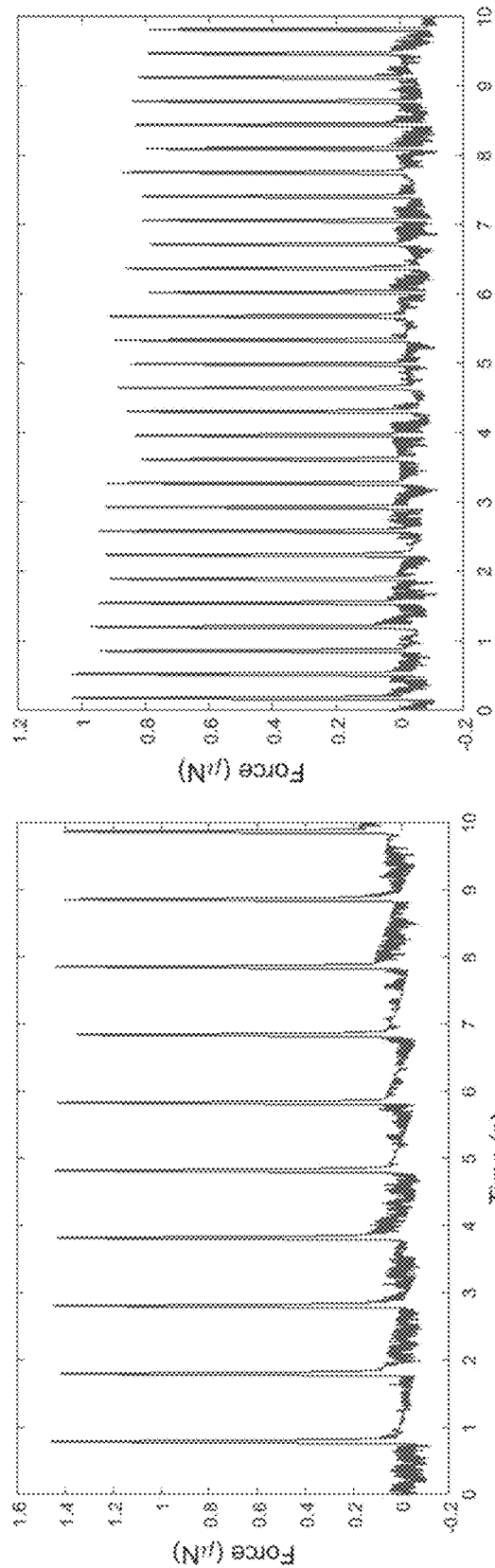
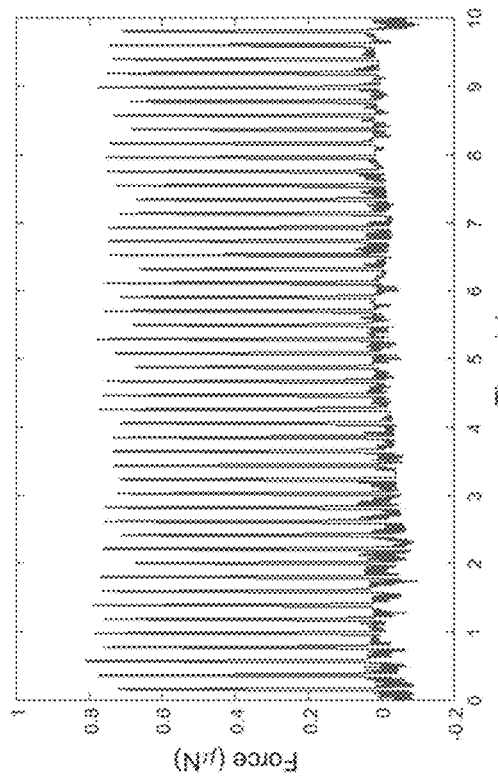
FIG. 6C
FIG. 6D
FIG. 6E

Traction Force Microscopy

Ribeiro et al.
Circulation Research 2017 xCELLigence RTCA Cardio

ACEA Biosciences Inc

Biowire

TARA Biosystems, Inc

SYSTEMS AND METHODS FOR DETERMINING CELL CONTRACTILITY

CROSS-REFERENCE TO RELATED APPLICATIONS

The present application claims priority from U.S. Provisional Patent Application No. 62/748,742 filed on Oct. 22, 2018, the contents of which are incorporated herein by reference.

FIELD

The present application relates generally to measuring cell function. More particularly, the application relates to systems and methods for determining cell contractility.

BACKGROUND

Cardiovascular diseases are the leading cause of mortality worldwide. Heart failure is one of the most common complications of cardiovascular disease, and often results because cardiomyocytes (CMs) lose their contractile function due to disease or damage. Existing therapies slow disease progression, but none can cure the underlying disease. Animal models are typically used to study cardiovascular disease, but they have shown poor translation to humans due to large differences in genetics and physiology [1]. Advances in pluripotent stem cell (PSC) technologies make it possible to create human cell-based models that mimic the in vivo structure, function and physiology of cardiovascular diseases [2]. This has driven significant interest in using 2D and 3D cell-based cardiac models to study and evaluate drug and stem-cell based therapies [3].

In all studies aimed at characterizing engineered CMs or other force-generating cells, contractility is the gold standard metric of cell function. Despite its critical importance to CM biology, these measurements are not a routine in vitro assay. This is due, in part, to the complexity of current contractility measurement systems. Methods to measure contractile force include atomic force microscopy, bending posts, micropost arrays, thin film curling or wrinkling, traction force microscopy (TFM) based on microbead movement, and carbon nanotube strain sensors, but these methods require specialized substrates, have poor sensitivity and low throughput, and/or are difficult to use, preventing widespread adoption.

SUMMARY

Described herein are systems and methods for determining the contractile function of one or more contracting cells or a contracting microtissue using ultrasound; systems and methods for measuring the effect an agent has on the contractile function of one or more contracting cells or a contracting microtissue using ultrasound; systems and methods for determining one or more elastic properties of a material using ultrasound; and systems and methods for determining one or more material properties of a material using ultrasound.

According to some embodiments, there is provided a system for determining the contractile function of one or more contracting cells or a contracting microtissue using ultrasound. The system comprises:
  a transducer that detects ultrasound waves reflected from one or more contracting cells or a contracting microtissue, and samples said detected waves to produce ultrasound signals; and
  an ultrasound controller for receiving the ultrasound signals from the transducer, the ultrasound controller comprising a processor for computing one or more relationships between the signals, and for analyzing the one or more computed relationships to determine the contractile function of the one or more contracting cells or the contracting microtissue.

According to some embodiments of the system for determining the contractile function of one or more contracting cells or a contracting microtissue using ultrasound, the transducer that detects the ultrasound waves reflected from the one or more contracting cells or the contracting microtissue also emits ultrasound energy to the one or more contracting cells or the contracting microtissue, and the system further comprises a switch configured to switch the transducer between emitting the ultrasound energy and detecting the reflected waves.

According to some embodiments of the system for determining the contractile function of one or more contracting cells or a contracting microtissue using ultrasound, the one or more contracting cells or the contracting microtissue is one or more contracting cells, and the transducer emits ultrasound energy at a frequency of between about 100 MHz and about 500 MHz.

According to some embodiments of the system for determining the contractile function of one or more contracting cells or a contracting microtissue using ultrasound, the one or more contracting cells or the contracting microtissue is one or more contracting cells, and the transducer emits ultrasound energy at a frequency of about 200 MHz, with a focal length of about 0.5 mm.

According to some embodiments of the system for determining the contractile function of one or more contracting cells or a contracting microtissue using ultrasound, the one or more contracting cells or the contracting microtissue is a contracting microtissue and the transducer emits ultrasound energy at a frequency of between about 20 MHz and about 200 MHz.

According to some embodiments of the system for determining the contractile function of one or more contracting cells or a contracting microtissue using ultrasound, the one or more contracting cells or the contracting microtissue is a contracting microtissue and the transducer emits ultrasound energy at a frequency of about 80 MHz, with a focal length of about 6 mm to about 8 mm.

According to some embodiments of the system for determining the contractile function of one or more contracting cells or a contracting microtissue using ultrasound, the system is configured to insonify the one or more contracting cells or the contracting microtissue at a pulse repetition rate that is faster than the rate of contraction of the cell or microtissue.

According to some embodiments of the system for determining the contractile function of one or more contracting cells or a contracting microtissue using ultrasound, the system is configured to insonify the one or more contracting cells or the contracting microtissue at a minimum of about 100, about 500 or about 1000 pulses per second.

According to some embodiments of the system for determining the contractile function of one or more contracting cells or a contracting microtissue using ultrasound, the system is configured to insonify the one or more contracting cells or the contracting microtissue at a minimum of about 100, about 500 or about 1000 pulses per second, and each sample is of:

a single pulse;

between about 10 and about 100 pulse bursts; or an average of a 50-pulse burst at a pulse repetition frequency of 500 kHz.

According to some embodiments of the system for determining the contractile function of one or more contracting cells or a contracting microtissue using ultrasound, the transducer is configured to sample (i.e., digitize) the detected ultrasound waves to produce the ultrasound signals at a minimum of between about 1 and about 50 gigasamples per second, or between about 1 and about 10 gigasamples per second.

According to some embodiments of the system for determining the contractile function of one or more contracting cells or a contracting microtissue using ultrasound, the transducer is configured to sample (i.e., digitize) the detected ultrasound waves to produce the ultrasound signals at a minimum of between about 1 and about 50 gigasamples per second, or between about 1 and about 10 gigasamples per second, and the sampling comprises about 10 to about 100 point signal averaging.

According to some embodiments of the system for determining the contractile function of one or more contracting cells or a contracting microtissue using ultrasound, the processor is configured to determine the axial displacement of the one or more contracting cells or the contracting microtissue from the one or more computed relationships.

According to some embodiments of the system for determining the contractile function of one or more contracting cells or a contracting microtissue using ultrasound, the processor is configured to determine the rate of change of deformation of the one or more contracting cells or the contracting microtissue from the one or more computed relationships.

According to some embodiments of the system for determining the contractile function of one or more contracting cells or a contracting microtissue using ultrasound, the processor is configured to determine the beat rate of the one or more contracting cells or the contracting microtissue from the one or more computed relationships.

According to some embodiments of the system for determining the contractile function of one or more contracting cells or a contracting microtissue using ultrasound, the processor is configured to determine the beat rhythm of the one or more contracting cells or the contracting microtissue from the one or more computed relationships.

According to some embodiments of the system for determining the contractile function of one or more contracting cells or a contracting microtissue using ultrasound, the processor is configured to determine the contractile force of the one or more contracting cells or the contracting microtissue from the one or more computed relationships.

According to some embodiments of the system for determining the contractile function of one or more contracting cells or a contracting microtissue using ultrasound, the system further comprises a stage configured to secure a receptacle containing the one or more contracting cells or the contracting microtissue, and the transducer is secured to the stage.

According to some embodiments of the system for determining the contractile function of one or more contracting cells or a contracting microtissue using ultrasound, the system further comprises a stage configured to secure a receptacle containing the one or more contracting cells or the contracting microtissue, and the receptacle is a tissue culture well plate.

According to some embodiments of the system for determining the contractile function of one or more contracting cells or a contracting microtissue using ultrasound, the transducer is in indirect contact with the one or more contracting cells or the contracting microtissue via a liquid medium.

According to some embodiments of the system for determining the contractile function of one or more contracting cells or a contracting microtissue using ultrasound, the transducer is configured to detect the reflected ultrasound waves from above the one or more contracting cells or the contracting microtissue and, optionally, through a cover portion of the receptacle.

According to some embodiments of the system for determining the contractile function of one or more contracting cells or a contracting microtissue using ultrasound, the transducer is configured to detect the reflected ultrasound waves from below the one or more contracting cells or the contracting microtissue and through at least part of the receptacle.

According to some embodiments of the system for determining the contractile function of one or more contracting cells or a contracting microtissue using ultrasound, the system further comprises an optical microscope having a visual sightline to the one or more contracting cells or the contracting microtissue.

According to some embodiments of the system for determining the contractile function of one or more contracting cells or a contracting microtissue using ultrasound, the one or more contracting cells are in a two-dimensional conformation.

According to some embodiments of the system for determining the contractile function of one or more contracting cells or a contracting microtissue using ultrasound, the contracting microtissue is in a three-dimensional conformation.

According to some embodiments of the system for determining the contractile function of one or more contracting cells or a contracting microtissue using ultrasound, the one or more contracting cells is a myocyte.

According to some embodiments of the system for determining the contractile function of one or more contracting cells or a contracting microtissue using ultrasound, the one or more contracting cells is a cardiomyocyte, including a primary cardiomyocyte.

According to some embodiments of the system for determining the contractile function of one or more contracting cells or a contracting microtissue using ultrasound, the cardiomyocyte is a stem cell-derived cardiomyocyte.

According to some embodiments of the system for determining the contractile function of one or more contracting cells or a contracting microtissue using ultrasound, the cardiomyocyte is an embryonic stem cell-derived cardiomyocyte.

According to some embodiments of the system for determining the contractile function of one or more contracting cells or a contracting microtissue using ultrasound, the cardiomyocyte is an induced pluripotent stem cell-derived cardiomyocyte.

According to some embodiments of the system for determining the contractile function of one or more contracting cells or a contracting microtissue using ultrasound, the one or more relationships comprise at least one of acquired signal amplitude; acquired signal phase; propagation delay or time of flight.

According to some embodiments, there is provided a method of determining the contractile function of one or more contracting cells or a contracting microtissue using ultrasound. The method comprises:

- detecting, through a transducer, ultrasound waves reflected from one or more contracting cells or a contracting microtissue;
- sampling, by the transducer, said detected waves to produce ultrasound signals;
- receiving the signals from the transducer at an ultrasound controller;
- computing with a processor one or more relationships between the signals; and
- analyzing the one or more computed relationship to determine the contractile function of the one or more contracting cells or the contracting microtissue.

According to some embodiments of the method of determining the contractile function of one or more contracting cells or a contracting microtissue using ultrasound, the transducer that detects the ultrasound waves reflected from the one or more contracting cells or the contracting microtissue also emits ultrasound energy to the one or more contracting cells or the contracting microtissue.

According to some embodiments of the method of determining the contractile function of one or more contracting cells or a contracting microtissue using ultrasound, the one or more contracting cells or the contracting microtissue is one or more contracting cells and the transducer emits ultrasound energy at a frequency of between about 100 MHz and about 500 MHz.

According to some embodiments of the method of determining the contractile function of one or more contracting cells or a contracting microtissue using ultrasound, the one or more contracting cells or the contracting microtissue is one or more contracting cells and the transducer emits ultrasound energy at a frequency of about 200 MHz, with a focal length of about 0.5 mm.

According to some embodiments of the method of determining the contractile function of one or more contracting cells or a contracting microtissue using ultrasound, the one or more contracting cells or the contracting microtissue is a contracting microtissue and the transducer emits ultrasound energy at a frequency of between about 20 MHz and about 200 MHz.

According to some embodiments of the method of determining the contractile function of one or more contracting cells or a contracting microtissue using ultrasound, the one or more contracting cells or the contracting microtissue is a contracting microtissue and the transducer emits ultrasound energy at a frequency of about 80 MHz, with a focal length of about 6 mm to about 8 mm.

According to some embodiments of the method of determining the contractile function of one or more contracting cells or a contracting microtissue using ultrasound, the one or more contracting cells or the contracting microtissue is insonified at a pulse repetition rate that is faster than the rate of contraction of the cell or microtissue.

According to some embodiments of the method of determining the contractile function of one or more contracting cells or a contracting microtissue using ultrasound, the one or more contracting cells or the contracting microtissue is insonified at a minimum of about 100, about 500 or about 1000 pulses per second.

According to some embodiments of the method of determining the contractile function of one or more contracting cells or a contracting microtissue using ultrasound, the one or more contracting cells or the contracting microtissue is insonified at a minimum of about 100, about 500 or about 1000 pulses per second, and each sample is:

- a single pulse;
- between about 10 and about 100 pulse bursts; or
- an average of a 50-pulse burst at a pulse repetition frequency of 500 kHz.

According to some embodiments of the method of determining the contractile function of one or more contracting cells or a contracting microtissue using ultrasound, the transducer samples (i.e., digitizes) the detected ultrasound waves to produce the ultrasound signals at a minimum of between about 1 and about 50 gigasamples per second, or between about 1 and about 10 gigasamples per second.

According to some embodiments of the method of determining the contractile function of one or more contracting cells or a contracting microtissue using ultrasound, the transducer samples (i.e., digitizes) the detected ultrasound waves to produce the ultrasound signals at a minimum of between about 1 and about 50 gigasamples per second, or between about 1 and about 10 gigasamples per second, and the digitizing comprises about 10 to about 100 point signal averaging.

According to some embodiments of the method of determining the contractile function of one or more contracting cells or a contracting microtissue using ultrasound, the processor determines the axial displacement of the one or more contracting cells or the contracting microtissue from the one or more computed relationships.

According to some embodiments of the method of determining the contractile function of one or more contracting cells or a contracting microtissue using ultrasound, the processor determines the rate of change of deformation of the one or more contracting cells or the contracting microtissue from the one or more computed relationships.

According to some embodiments of the method of determining the contractile function of one or more contracting cells or a contracting microtissue using ultrasound, the processor determines the beat rate of the one or more contracting cells or the contracting microtissue from the one or more computed relationships.

According to some embodiments of the method of determining the contractile function of one or more contracting cells or a contracting microtissue using ultrasound, the processor determines the beat rhythm of the one or more contracting cells or the contracting microtissue from the one or more computed relationships.

According to some embodiments of the method of determining the contractile function of one or more contracting cells or a contracting microtissue using ultrasound, the processor determines the contractile force of the one or more contracting cells or the contracting microtissue from the one or more computed relationships.

According to some embodiments of the method of determining the contractile function of one or more contracting cells or a contracting microtissue using ultrasound, the one or more contracting cells or the contracting microtissue is contained in a receptacle secured to a stage, and the transducer is secured to the stage.

According to some embodiments of the method of determining the contractile function of one or more contracting cells or a contracting microtissue using ultrasound, the one or more contracting cells or the contracting microtissue is contained in a receptacle secured to a stage, and the receptacle is a tissue culture well plate.

According to some embodiments of the method of determining the contractile function of one or more contracting cells or a contracting microtissue using ultrasound, the transducer is in indirect contact with the one or more contracting cells or the contracting microtissue via a liquid medium.

According to some embodiments of the method of determining the contractile function of one or more contracting cells or a contracting microtissue using ultrasound, the transducer detects the reflected ultrasound waves from above the one or more contracting cells or the contracting microtissue and, optionally, through a cover portion of the receptacle.

According to some embodiments of the method of determining the contractile function of one or more contracting cells or a contracting microtissue using ultrasound, the transducer detects the reflected ultrasound waves from below the one or more contracting cells or the contracting microtissue and through the at least part of the receptacle.

According to some embodiments of the method of determining the contractile function of one or more contracting cells or a contracting microtissue using ultrasound, the method further comprises visualizing the one or more contracting cells or the contracting microtissue with an optical microscope having a visual sightline to the one or more contracting cells or the contracting microtissue.

According to some embodiments of the method of determining the contractile function of one or more contracting cells or a contracting microtissue using ultrasound, the one or more contracting cells are in a two-dimensional conformation.

According to some embodiments of the method of determining the contractile function of one or more contracting cells or a contracting microtissue using ultrasound, the contracting microtissue is in a three-dimensional conformation.

According to some embodiments of the method of determining the contractile function of one or more contracting cells or a contracting microtissue using ultrasound, the one or more contracting cells is a myocyte.

According to some embodiments of the method of determining the contractile function of one or more contracting cells or a contracting microtissue using ultrasound provided herein, the one or more contracting cells is a cardiomyocyte, including a primary cardiomyocyte.

According to some embodiments of the method of determining the contractile function of one or more contracting cells or a contracting microtissue using ultrasound, the cardiomyocyte is a stem cell-derived cardiomyocyte.

According to some embodiments of the method of determining the contractile function of one or more contracting cells or a contracting microtissue using ultrasound, the cardiomyocyte is an embryonic stem cell-derived cardiomyocyte.

According to some embodiments of the method of determining the contractile function of one or more contracting cells or a contracting microtissue using ultrasound, the cardiomyocyte is an induced pluripotent stem cell-derived cardiomyocyte.

According to some embodiments of the method of determining the contractile function of one or more contracting cells or a contracting microtissue using ultrasound, the one or more relationships comprise at least one of acquired signal amplitude; acquired signal phase; propagation delay or time of flight.

According to some embodiments, there is provided a method of measuring the effect an agent has on the contractile function of one or more contracting cells or a contracting microtissue using ultrasound. The method comprises:

detecting, through a transducer, ultrasound waves reflected from one or more contracting cells or a contracting microtissue contacted with an agent;
  sampling, by the transducer, said detected waves to produce ultrasound signals;
  receiving the signals from the transducer at an ultrasound controller;
  computing with a processor one or more relationships between the signals;
  analyzing the one or more computed relationship to determine the contractile function of the one or more contracting cells or the contracting microtissue contacted with the agent; and
  comparing the contractile function of the one or more contracting cells or the contracting microtissue with the contractile function of the one or more contracting cells or the contracting microtissue in the absence of contact with the agent.

According to some embodiments, there is provided a system for determining one or more elastic properties of a material using ultrasound. The system comprises:

a first transducer that emits a pushing wave that travels through a material and creates one or more shear waves;
  a second transducer that acquires data on the propagation of the one or more shear waves;
  an ultrasound controller for receiving the acquired data on the propagation of the one or more shear waves from the second transducer, the ultrasound controller comprising a processor for computing one or more relationships between the acquired data on the propagation of the one or more shear waves, and for analyzing the one or more computed relationships to determine the one or more elastic properties of the material.

According to some embodiments of the system for determining one or more elastic properties of a material using ultrasound, the material is a cell or a tissue.

According to some embodiments of the system for determining one or more elastic properties of a material using ultrasound, the elastic property is a shear modulus, a Young's modulus, a storage modulus, a loss modulus, or a derived quantitative material property.

According to some embodiments, there is provided a method of determining one or more material properties of a material using ultrasound. The method comprises:

emitting, through a first transducer, a pushing wave that travels through a material, creating one or more shear waves;
  acquiring, through a second transducer, data on the propagation of the one or more shear waves;
  receiving the acquired data on the propagation of the one or more shear waves from the second transducer at an ultrasound controller;
  computing with a processor one or more relationships between the data on the propagation of the one or more shear waves; and
  analyzing the one or more computed relationship to determine the one or more elastic properties of the material.

According to some embodiments of the method of determining one or more material properties of a material using ultrasound, the material property is an elastic property or a viscoelastic property.

According to some embodiments of the method of determining one or more material properties of a material using ultrasound, the material is a cell or a tissue.

According to some embodiments of the method of determining one or more material properties of a material using ultrasound, the elastic property is a shear modulus, a Young's modulus, a storage modulus, a loss modulus, or a derived quantitative material property.

BRIEF DESCRIPTIONS OF THE DRAWINGS

For a better understanding of the various implementations described herein and to show more clearly how they may be carried into effect, reference will now be made, by way of example only, to the accompanying drawings in which:

FIGS. 6A to 6G depict measured force profiles of CMs, according to non-limiting embodiments;

DETAILED DESCRIPTION

Figure 1A:
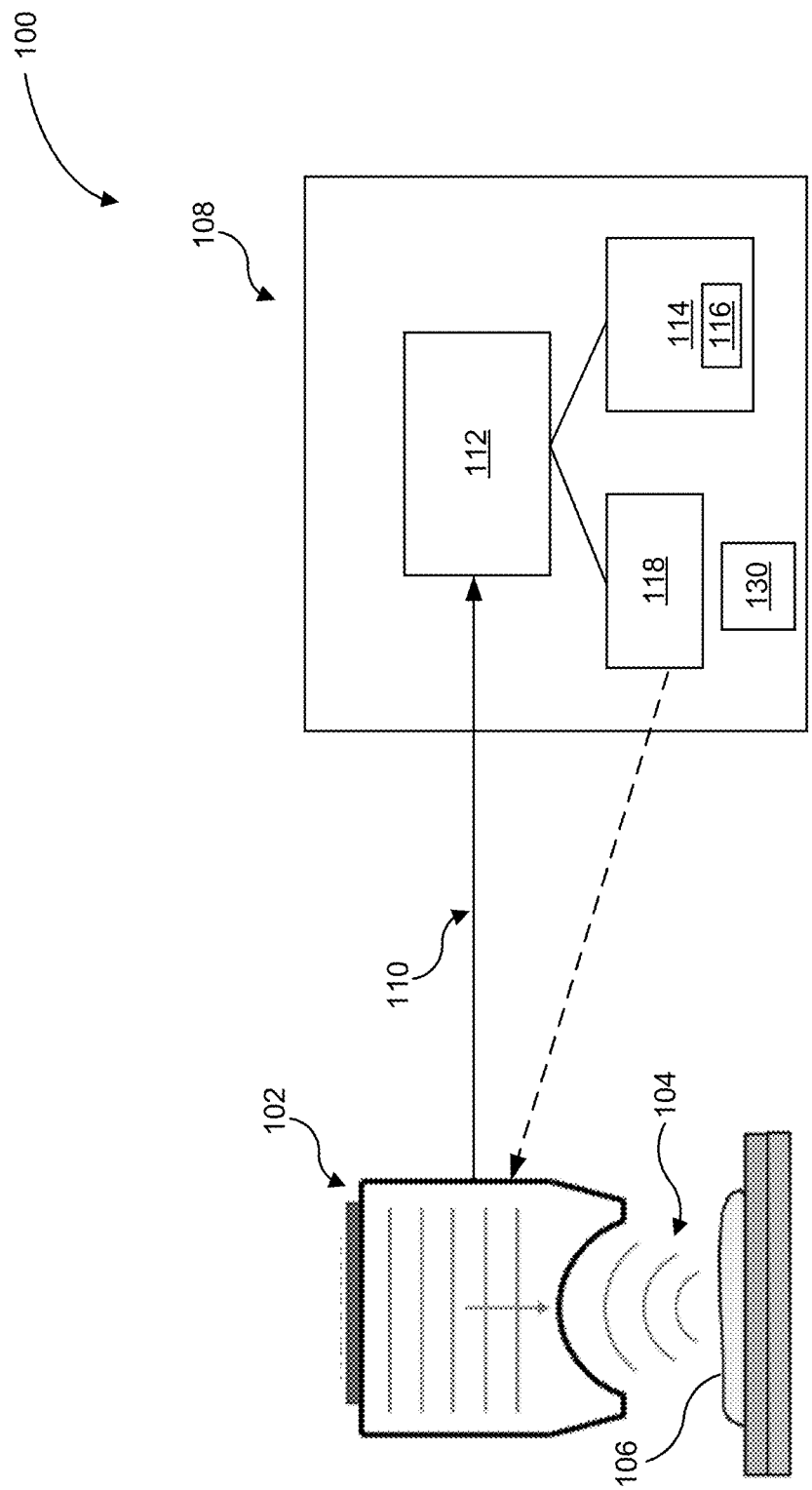
FIGS. 1A to 1D depict a system for determining the contractile function of one or more contracting cells or a contracting microtissue using ultrasound, according to non-limiting embodiments.

Herein described are systems and methods for determining cell contractility and, according to some embodiments, one or more material properties of a material. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments of the present application described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein. Any systems, method steps, method blocks, components, parts of components, and the like described herein in the singular are to be interpreted as also including a description of such systems, method steps or tasks, components, parts of components, and the like in the plural, and vice versa.

The term "contracting cell," as used herein, refers to any cell that is capable of contraction. The contracting cell may originate from a human or a non-human animal. Methods to derive, isolate, purify and culture contracting cells are known in the art. In some embodiments, the contracting cell is a muscle cell. Muscle cells include, but are not limited to, myoblasts, myocytes and muscle fibers. In some embodiments, the myocyte may be a cardiac muscle cell (i.e., a cardiomyocyte), a skeletal muscle cell, or a smooth muscle cell. In certain embodiments, the contracting cell may be a primary tissue-derived contracting cell or a stem cell-derived contracting cell. In certain embodiments, the stem cell-derived contracting cell may be an embryonic stem cell (ESC)-derived contracting cell or an induced pluripotent stem cell (iPSC)-derived contracting cell, as known in the art.

The term "contracting microtissue," as used herein, refers to any tissue or group of cells comprising at least one contracting cell, such as a cardiomyocyte. The contracting microtissue may be homogeneous (i.e., composed of one cell type) or heterogeneous (i.e., composed of more than one cell type). The contracting microtissue may be a spheroid, an organoid, or another three-dimensional (3D) cell culture model. Methods of deriving and producing contracting microtissues are known in the art.

Figure 16A:
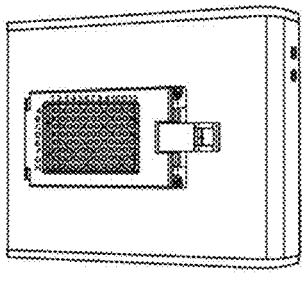
FIGS. 16A to 16C depict various instruments and imaging results from conventional traction force microscopy, xCELLigence RTCA Cardio™ and Biowire™, according to non-limiting embodiments.
Figure 16B:
Figure 16C:
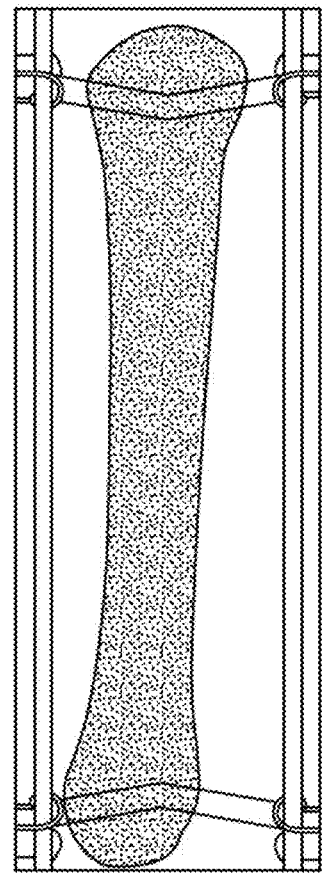

The complexity of current contractility measurement systems, including atomic force microscopy [4], bending posts [5], micropost arrays [6]-[8], thin film curling [9]-[11] or wrinkling [12], traction force microscopy (TFM) based on microbead movement [13] and carbon nanotube strain sensors[14] (see, for example, FIGS. 16A to 16C), make it difficult to implement them as a routine in vitro assay. These contractility systems require special substrates, high resolution optical imaging and/or cannot measure the force of contraction, limiting adoption into specialized cardiac platforms.

According to at least some embodiments, the systems and methods described herein use high frequency ultrasound operating at a center frequency of, for example, about 80 to about 500 MHz to measure the deformation of a CM during contraction with high temporal and spatial resolution. Using a single measurement, the beat rate, beat rhythm and/or force of contraction can be determined. According to some embodiments, the system and methods incorporate standard laboratory microtiter plates. Examples of applications in which the described systems and methods may be used include drug screening, toxicology evaluation, assessing and monitoring induced pluripotent stem cell (iPSC) derived CMs for regenerative repair and modeling disease physiology.

Attention is directed to FIGS. 1A to 1D, which depict an example system 100 for determining the contractile function of one or more contracting cells or a contracting microtissue using ultrasound, according to non-limiting embodiments. System 100 comprises at least one transducer, such as transducer 102, that is configured to produce ultrasound signals 110 representative of ultrasound pressure wave(s) 104 reflected from one or more contracting cells, such as cell 106, or a contracting microtissue, and which are received, detected and sampled by transducer 102 to produce the ultrasound signals 110. As used herein, "sampling" (or variations of that term) refers to the digitizing of analogue wave(s), such as by digital sampling means known in the art.

According to some embodiments, the contracting cell(s) is a myocyte or a cardiomyocyte (which may be a primary cardiomyocyte). According to some embodiments, the cardiomyocyte(s) is a stem cell-derived cardiomyocyte, an embryonic stem cell-derived cardiomyocyte or an induced pluripotent stem cell-derived cardiomyocyte.

According to some embodiments, the contracting cell(s) are in a two-dimensional conformation. According to some embodiments, the contracting microtissue(s) are in a three-dimensional conformation.

Example system 100 further comprises an ultrasound controller, such as ultrasound controller 108, configured to receive the ultrasound signals 110 acquired from the ultrasound transducer 102. Ultrasound controller 108 comprises a processor, such as processor(s) 112, configured to compute one or more relationships between the acquired ultrasound signals 110 and to analyze one or more computed relationships to determine the contractile function(s) of the one or more contracting cells (e.g., cell(s) 106) or the contracting microtissue. According to some embodiments, the one or more relationships comprise at least one of: acquired signal amplitude; acquired signal phase; propagation delay of the acquired signal; and Time-of-Flight (ToF) of the acquired signal.

Processor 112 is configured to control at least some of the operations of ultrasound controller 108. As used herein, the terms "processing device", "processing devices", "processing device(s)", "processor", "processors" or "processor(s)" may refer to any combination and number of processing devices, and the like, suitable for carrying out the actions or methods described herein. For example, processor device 112 may comprise any suitable processing device, or combination of processing devices, including but not limited to a microprocessor, a central processing unit (CPU) and the like. Other suitable processing devices are within the scope of the application.

According to some embodiments, ultrasound controller 108 comprises at least one memory, such as memory 114. Memory 114 can comprise any suitable memory device, including but not limited to any suitable one of, or combination of, a local and/or remote volatile memory, non-volatile memory, random access memory (RAM), read-only memory (ROM), hard drive, optical drive, buffer(s), cache (s), flash memory, magnetic computer storage devices (e.g. hard disks, floppy disks, and magnetic tape), optical memory ((e.g., CD(s) and DVD(s)), and the like. Other suitable memory devices are within the scope of the application. As such, it is understood that the term "memory", or any variation thereof, as used herein may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processing device(s) and/or microcontroller(s) described herein. Memory 114 comprises or is enabled to store computer-executable instructions 116 for execution by at least one processing device, including processor 112. Although FIG. 1A depicts memory 114 as situated locally to processor 112, memory 114 may be remotely situated or located from processor 112 or ultrasound controller 108, or memory 114 may comprise a combination of local and remote storage. According to some embodiments, processor 112 is coupled to or otherwise operatively connected to memory 114. In other words, according to some embodiments, memory 114 and computer-executable instructions 116 are accessible to processor 112.

According to some embodiments, ultrasound transducer 102 is further configured to emit ultrasound energy (e.g., pressure wave(s)) to cell(s) 106 or the contracting microtissue and example system 100 further comprises a switch or other actuating device, such as switch 118, configured to switch the ultrasound transducer 102 between emitting the ultrasound energy (a first state) and acquiring/detecting and sampling the reflected ultrasound pressure wave(s) 104 to produce corresponding ultrasound signals 110 (a second state). For example, according to some embodiments, computer-executable instructions 116, when executed cause the processor 112 to switch between the first and second states. According to some embodiments, switch 118 comprises at least one trigger card, also known in the art as a multi channel pulse generator. According to some embodiments, ultrasound controller 108 further comprises a trigger 130 operatively coupled to processor 112 and switch 118 configured to compel the ultrasound transducer 102 to emit ultrasound energy when actuated. Trigger 130 may comprise one or more of a command signal, control data or trigger data that is transmitted by processor 112 to the ultrasound transducer 102.

According to some embodiments, ultrasound transducer 102 is configured to emit ultrasound energy at a frequency of between about 20 MHz and about 500 MHz to the contracting cell(s). According to some embodiments, ultrasound transducer 102 is configured to emit ultrasound energy at a frequency of about 200 MHz, with a focal length of about 0.5 mm. According to some embodiments, the microtissue is contracting ("contracting microtissue") and the ultrasound transducer 102 is configured to emit ultrasound energy at a frequency of between about 20 MHz and about 200 MHz, or the ultrasound transducer 102 emits ultrasound energy at a frequency of about 80 MHz, with a focal length of about 6 mm to about 8 mm.

According to some embodiments, the ultrasound transducer 102 is configured to insonify the cell(s) or microtissue(s) at a pulse repetition rate (that may or may not correspond to transducer 102's sampling rate of the received reflected ultrasound pressure wave(s) 104) that is faster than the rate of contraction of the cell(s) or microtissue(s). According to some embodiments, the ultrasound transducer 102 is configured to insonify the cell(s) or microtissue(s) at a minimum of about 100 pulses per second, about 500 pulses per second or about 1000 pulses per second. According to some embodiments, each sample is of: a single pulse, between about 10 and about 100 pulse bursts, or an average of about a 50-pulse burst at a pulse repetition frequency of about 500 kHz.

According to some embodiments, processor 112 is configured to digitize the acquired ultrasound signals 110 at a minimum of between about 1 and about 50 gigasamples per second (GS/s), or between about 1 and about 10 GS/s. For example, according to some embodiments, computer-executable instructions 116, when executed, may enable processor 112 to digitize the acquired ultrasound signals 110 according to suitable processes. According to some embodiments, the digitizing the acquired ultrasound signals 110 comprises about 10 to about 100 point signal averaging.

In computing the one or more relationships between the acquired ultrasound signals and analyzing the one or more relationships to determine the contractile function of the contracting cell(s) or microtissue(s), processor 112 is configured to perform one or more of the following: determine the axial displacement of the one or more contracting cells or the contracting microtissue from the one or more computed relationships; determine the rate of change of deformation of the one or more contracting cells or the contracting microtissue from the one or more computed relationships; determine the beat rate of the one or more contracting cells or the contracting microtissue from the one or more computed relationships; determine the beat rhythm of the one or more contracting cells or the contracting microtissue from the one or more computed relationships; and, determine the contractile force of the one or more contracting cells or the contracting microtissue from the one or more computed relationships.

A variety of arrangements of the ultrasound transducer(s), cell(s) and microtissue(s) are contemplated. According to some embodiments, example system 100 further comprises a stage, such as stage 120 (see, for example, FIGS. 1C and 1D), configured to secure a receptacle 122 containing the contracting cell(s) or the microtissue(s), wherein the ultrasound transducer is secured to the stage (see, for example, ultrasound transducer 102C depicted in FIG. 1C). According to some embodiments, the receptacle is a tissue culture well plate (see, for example, well plate 124 depicted in FIG. 1B). According to some embodiments, the ultrasound transducer is in indirect contact with the contracting cell(s) or microtissue(s) via a liquid medium (see, for example, ultrasound transducer 102B and liquid medium 126 depicted in FIG. 1B). According to some embodiments, the ultrasound transducer is configured to acquire/detect and process/sample the reflected ultrasound pressure wave(s) 104 from above the contracting cell(s) or microtissue(s) (see, for example, FIGS. 1A to 1D).

Figure 1B:
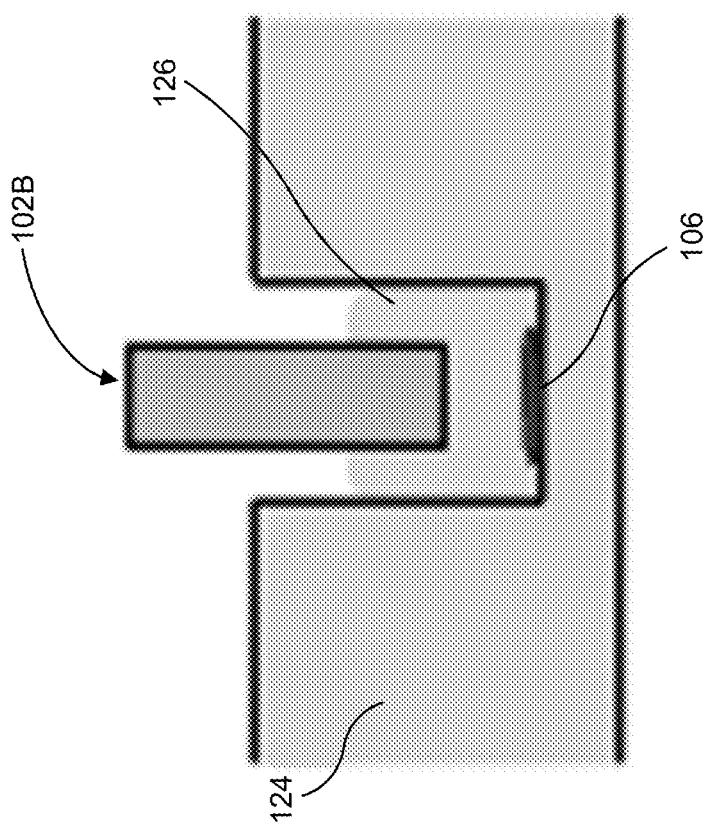
Figure 1C:
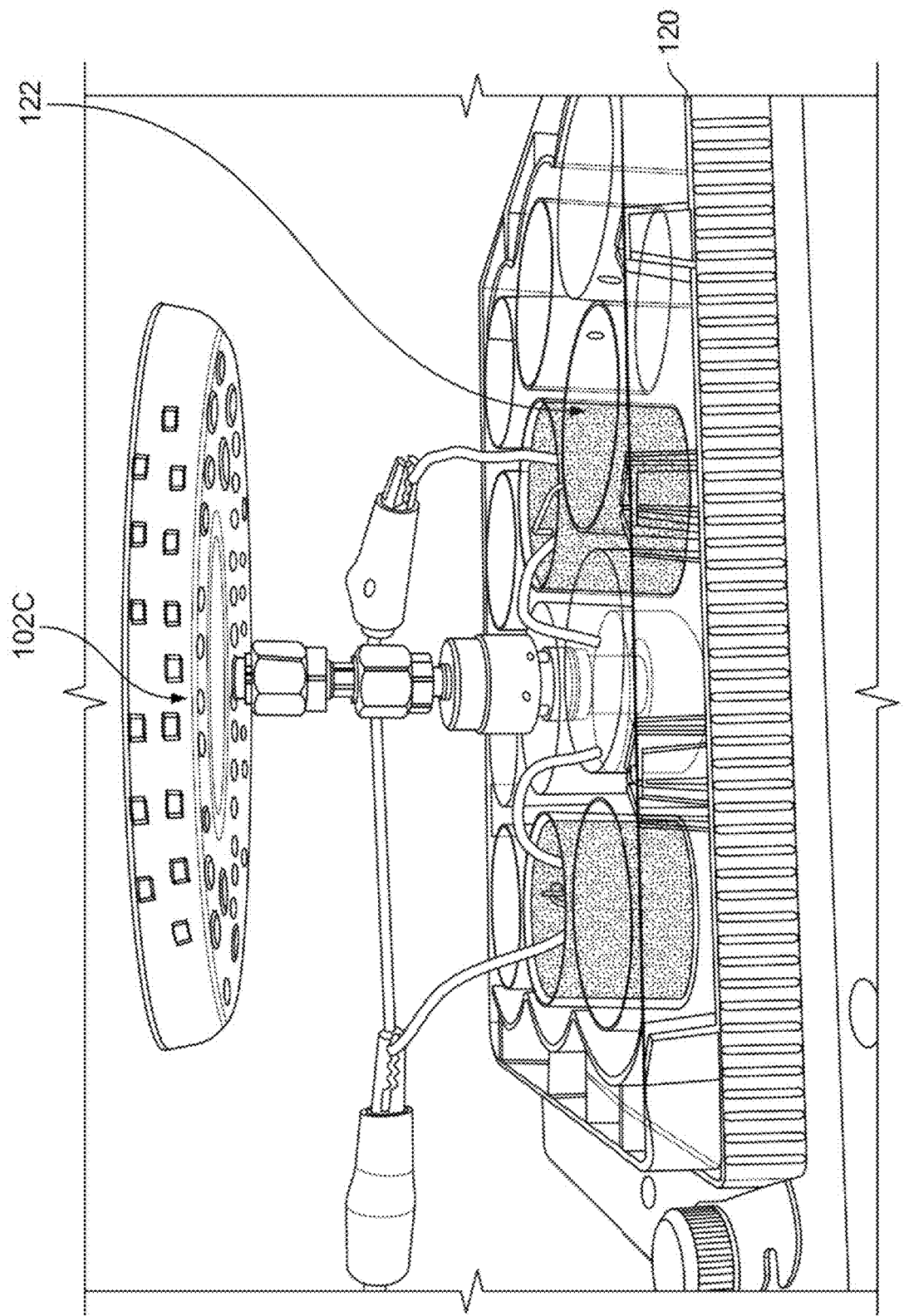
Figure 1D:
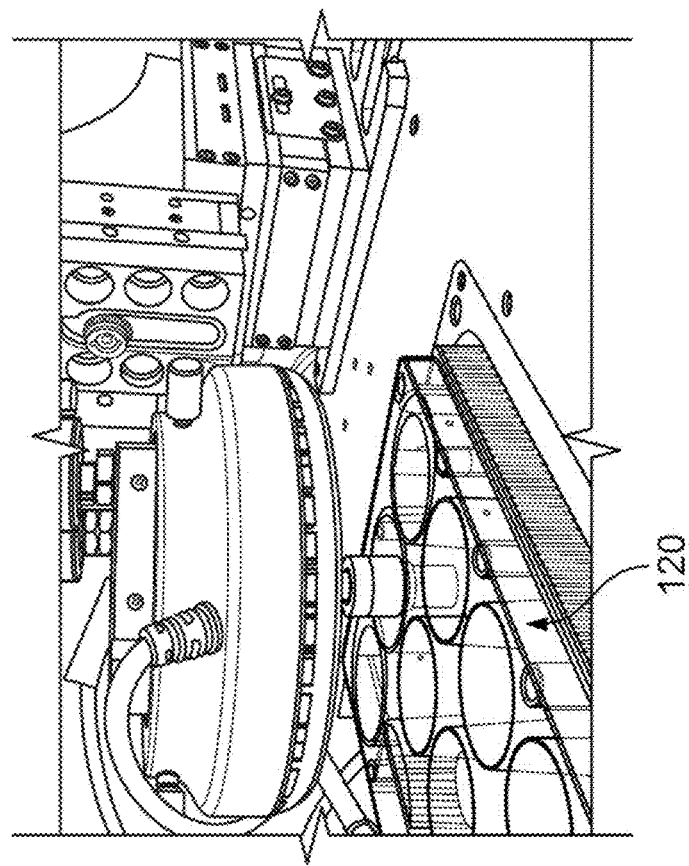
Figure 1D:
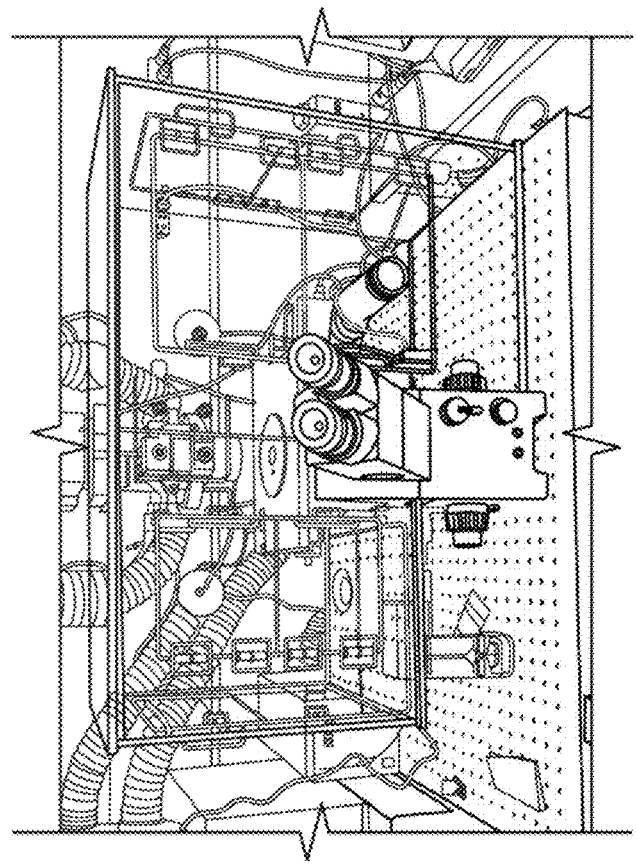
Figure 2:
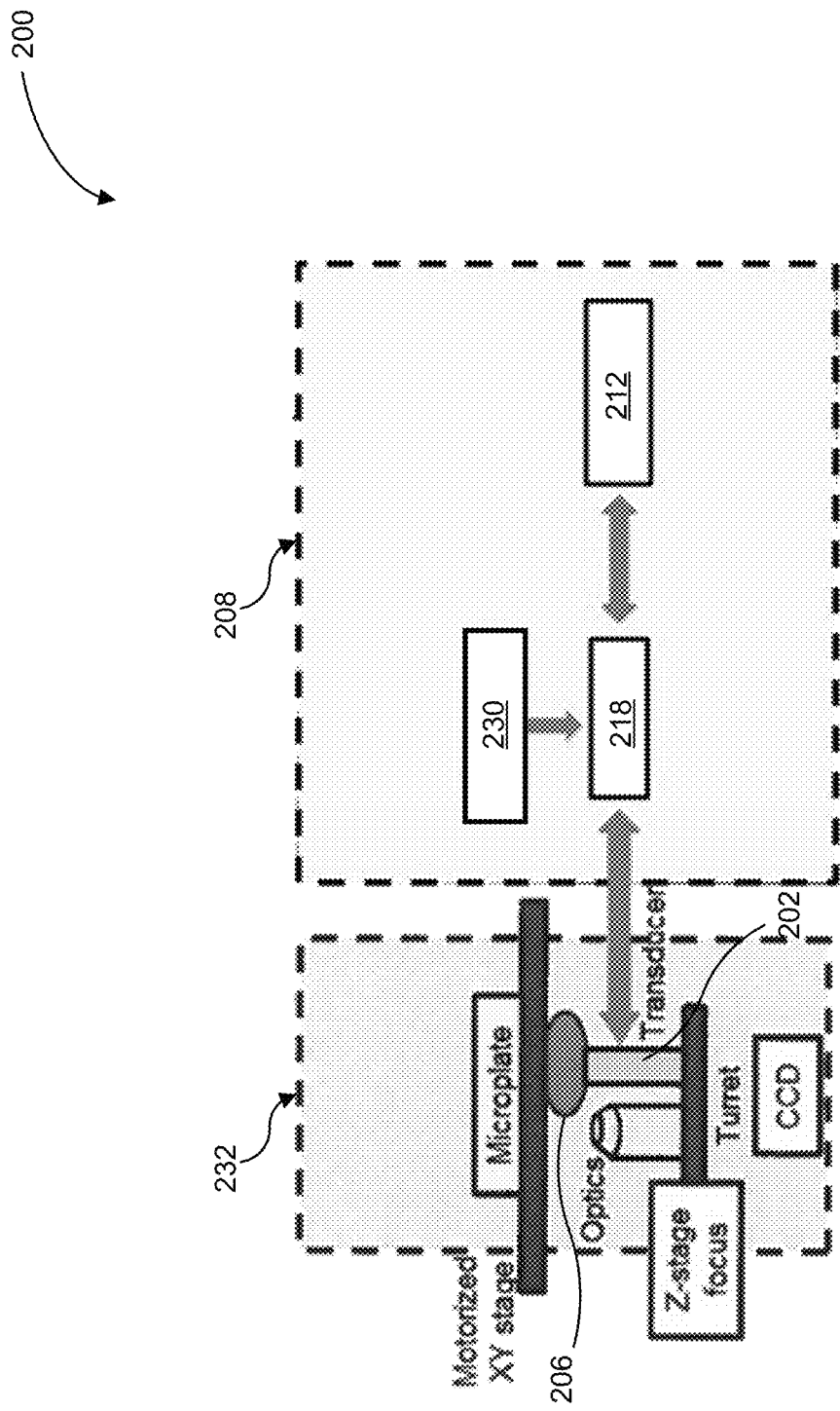
FIG. 2 depicts a system for determining the contractile function of one or more contracting cells or a contracting microtissue using ultrasound, according to another set of non-limiting embodiments.

According to some embodiments, the ultrasound transducer is configured to acquire/detect the reflected ultrasound pressure wave(s) 104 from below the contracting cell(s) or microtissue(s). Attention is directed to FIG. 2, which depicts example system 200 for determining the contractile function of one or more contracting cells or a contracting microtissue using ultrasound, according to non-limiting embodiments, and in which like or similar elements are denoted by like or similar numbers in FIGS. 1A to 1D. For simplicity and ease of understanding, discussion of the systems and devices depicted in FIG. 2 will focus on certain similarities and differences from those depicted in FIGS. 1A to 1D.

As depicted in FIG. 2, according to some embodiments, example system 200 comprises an optical microscope 232 having a visual sightline to the contracting cell(s) or the microtissue(s). The ultrasound transducer 202 is configured to acquire the ultrasound signals from below the contracting cell(s) or microtissue(s) and through at least part of the receptacle. In the non-limiting example system depicted in FIG. 2, the optics and the ultrasound transducer 202 are on the same side of the receptacle containing the contracting cell(s) or microtissue(s), and cannot be used at the same time. Images are captured using a microscope charge-coupled device (CCD) camera to identify the cell(s) or microtissue(s) to be measured. The motorized XY stage is then moved so that the cell(s) or microtissue(s) to be measured are directly above the transducer. The distance between the optics and transducer are known. The Z-stage moves the optics and transducer up and down for focusing. It will be appreciated from the disclosure herein that the optical microscope is not necessary to carry out the measurements, as the measurements can be taken exclusively by a standalone ultrasound-only system. In some embodiments, the systems, methods and devices described herein may be provided as a black box system (not shown), for accepting one or more well plates (or other means for containing or supporting cell(s) or microtissue(s)). After placing the well plates (for example) into the black box system, a user can then actuate the system (such as by pushing a button on the black box system) and obtain results which may be communicated by wired or wireless means (as discussed herein) by the black box system to ultrasound controller 108 for processing, such as by the applicable method blocks described herein.

In contrast to the non-limiting example system depicted in FIG. 2, according to some embodiments, the ultrasound transducer and the microscope optics may be vertically co-aligned to allow simultaneous optical and ultrasound imaging. For example, the ultrasound transducer may be configured to acquire/detect the reflected ultrasound pressure wave(s) 104 from above the contracting cell(s) or microtissue(s) (as depicted in FIG. 1B), whereas the microscope optics may be configured to simultaneously capture images of the contracting cell(s) or microtissue(s) from below.

Figure 3:
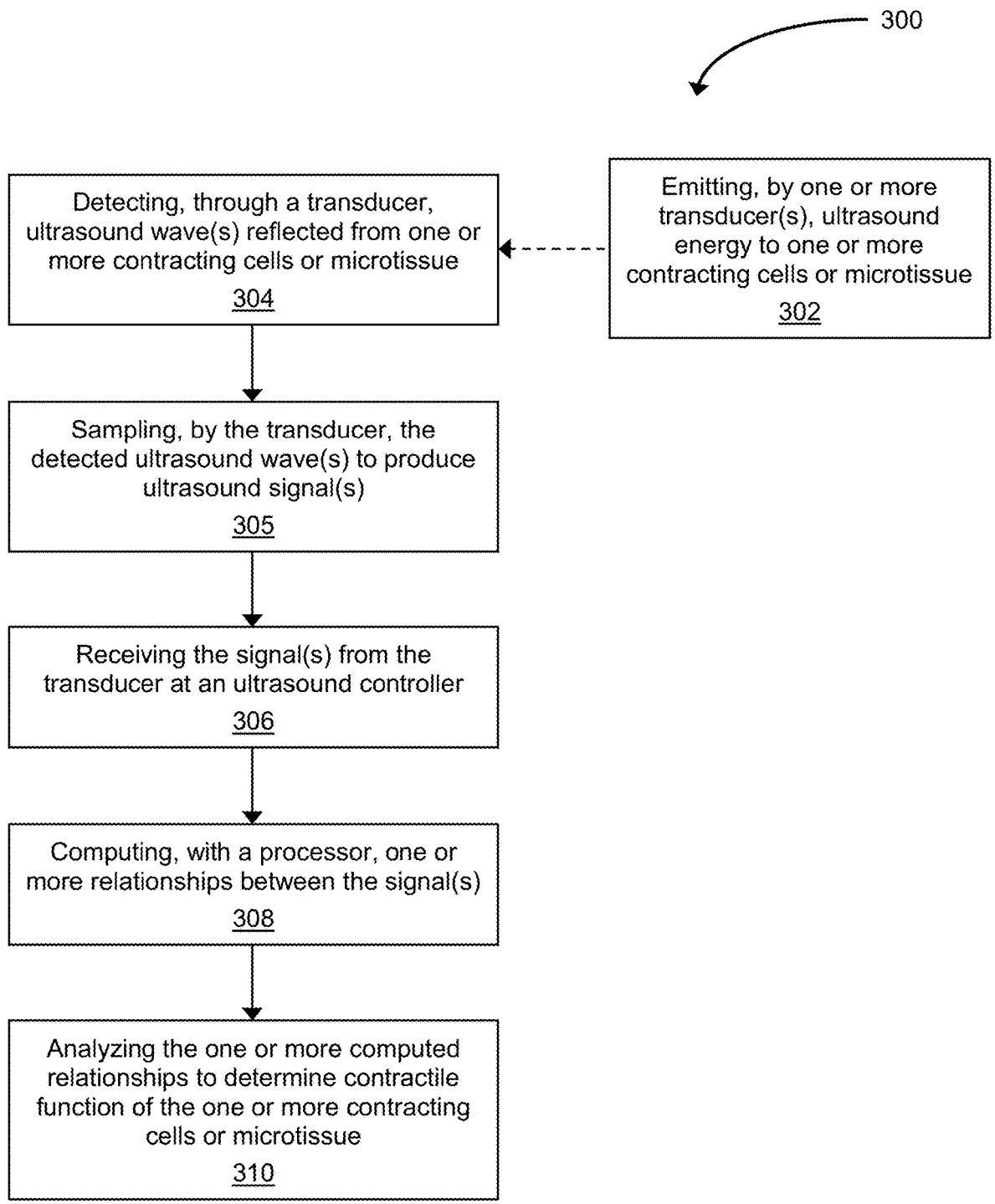
FIG. 3 depicts a method for determining the contractile function of one or more contracting cells or a contracting microtissue using ultrasound, according to non-limiting embodiments.

Attention is directed to FIG. 3 which depicts a flowchart of an example method 300 of determining the contractile function of one or more contracting cells or contracting microtissue using ultrasound, according to non-limiting embodiments. In order to assist with the explanation of method 300, it will be assumed that method 300 is performed using example systems 100 and/or 200, as indicated. Furthermore, the following discussion of method 300 will lead to a further understanding of systems 100 and 200, and the various components of those systems. However, it is to be understood that systems 100 and 200, and/or method 300, can be varied and need not work exactly as discussed herein in conjunction with each other, and that such variations are within the scope of the present embodiments. It is to be emphasized, however, that method 300 need not be performed in the exact sequence as shown, unless otherwise indicated; and likewise various blocks may be performed in parallel rather than in sequence. Hence, the elements of method 300 are referred to herein as "blocks" rather than "steps". It is also to be understood, however, that method 300 can be implemented on variations of systems 100 and 200 as well.

At block 304, using a transducer, such as transducers 102 or 202, ultrasound pressure wave(s) 104 reflected from one or more contracting cells or a contracting microtissue are acquired/detected and at block 305, the acquired/detected ultrasound pressure wave(s) 104 are sampled by transducer 102 to produce ultrasound signals 110. At block 306, the ultrasound signals 110 are received from the ultrasound transducer at an ultrasound controller, such as ultrasound controller 108. At block 308, the acquired ultrasound signals are computed to determine one or more relationships between the acquired ultrasound signals (e.g., acquired ultrasound signals 110 received by the ultrasound controller 108 are processed by processor 112 to determine one or more relationships between acquired signals). As discussed above, non-limiting examples of the one or more relationships between the acquired ultrasound signals is at least one of: acquired ultrasound signal amplitude; acquired ultrasound signal phase; propagation delay of the acquired ultrasound signals; and, time of flight of the acquired ultrasound signals. At block 310, the one or more computed relationships are analyzed to determine contractile function of the one or more contracting cell(s) or microtissue(s).

As discussed above, according to some embodiments, the ultrasound transducer(s), in addition to acquiring/detecting and sampling the reflected ultrasound pressure wave(s) 104 to thereby produce ultrasound signals 110, emit ultrasound energy to the contracting cell(s) or the microtissue(s) (see, for example, block 302).

According to some embodiments, the methods and systems described herein may be employed to measure the effect an agent has on the contractile function of one or more contracting cells or a contracting microtissue(s) using ultrasound. Examples of agents having an effect on the contractile function of contracting cell(s) or contracting microtissue(s) include, but are not limited to: stimulants that increase the beat rate and/or force of contraction, such as caffeine and epinephrine; calcium channel blockers that are used to treat high blood pressure, such as verapamil and nifedipine; chemotherapy drugs that can cause heart damage, such as doxorubicin; and general medications that can cause unexpected heart damage, such as rofecoxib (i.e., Vioxx™).

Figure 4:
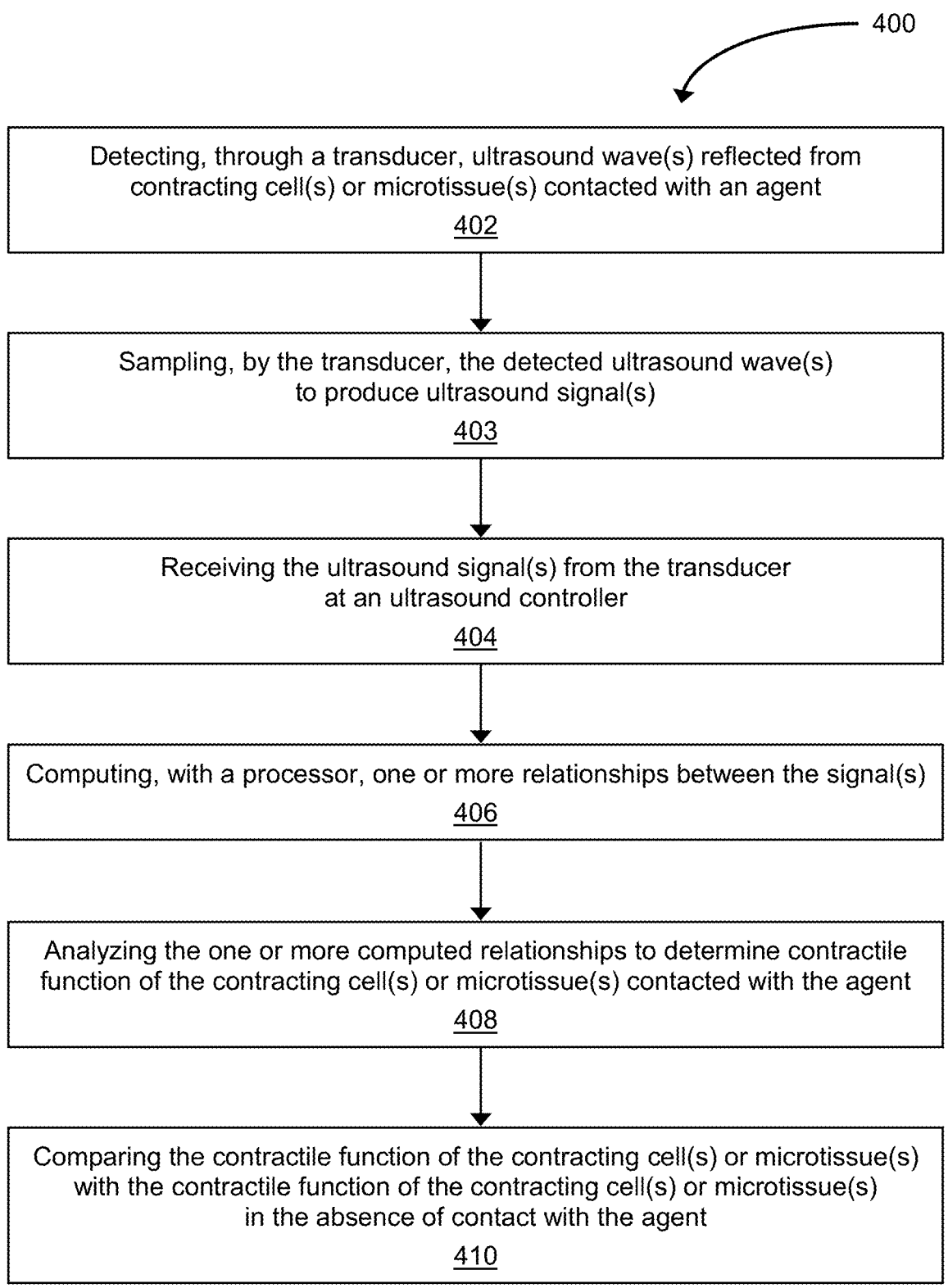
FIG. 4 depicts a method for measuring the effect an agent has on the contractile function of one or more contracting cells or a contracting microtissue using ultrasound, according to non-limiting embodiments.

Attention is directed to FIG. 4 which depicts a flowchart of an example method 400 of measuring the effect an agent has on the contractile function of one or more contracting cells or a contracting microtissue using ultrasound. At block 402, ultrasound wave(s) reflected from the contracting cell(s) or microtissue(s) contacted with an agent are acquired/detected at an ultrasound transducer, such as ultrasound transducer 102 or 202, which at block 403 samples the detected ultrasound wave(s) (such as ultrasound pressure wave(s) 104) to thereby produce ultrasound signals, such as ultrasound signals 110. At block 404, the ultrasound signals are received from the ultrasound transducer by the ultrasound controller (such as ultrasound controller 108 or 208). At block 406, one or more relationships between the acquired signals are computed with the processor. At block 408, the one or more computed relationships are analyzed to determine the contractile function of the contracting cell(s) or microtissue(s) contacted with the agent. At block 410, the contractile function of the contracting cell(s) or microtissue(s) is compared to the contractile function of the contracting cell(s) or microtissue(s) in the absence of contact with the agent.

Figure 17:
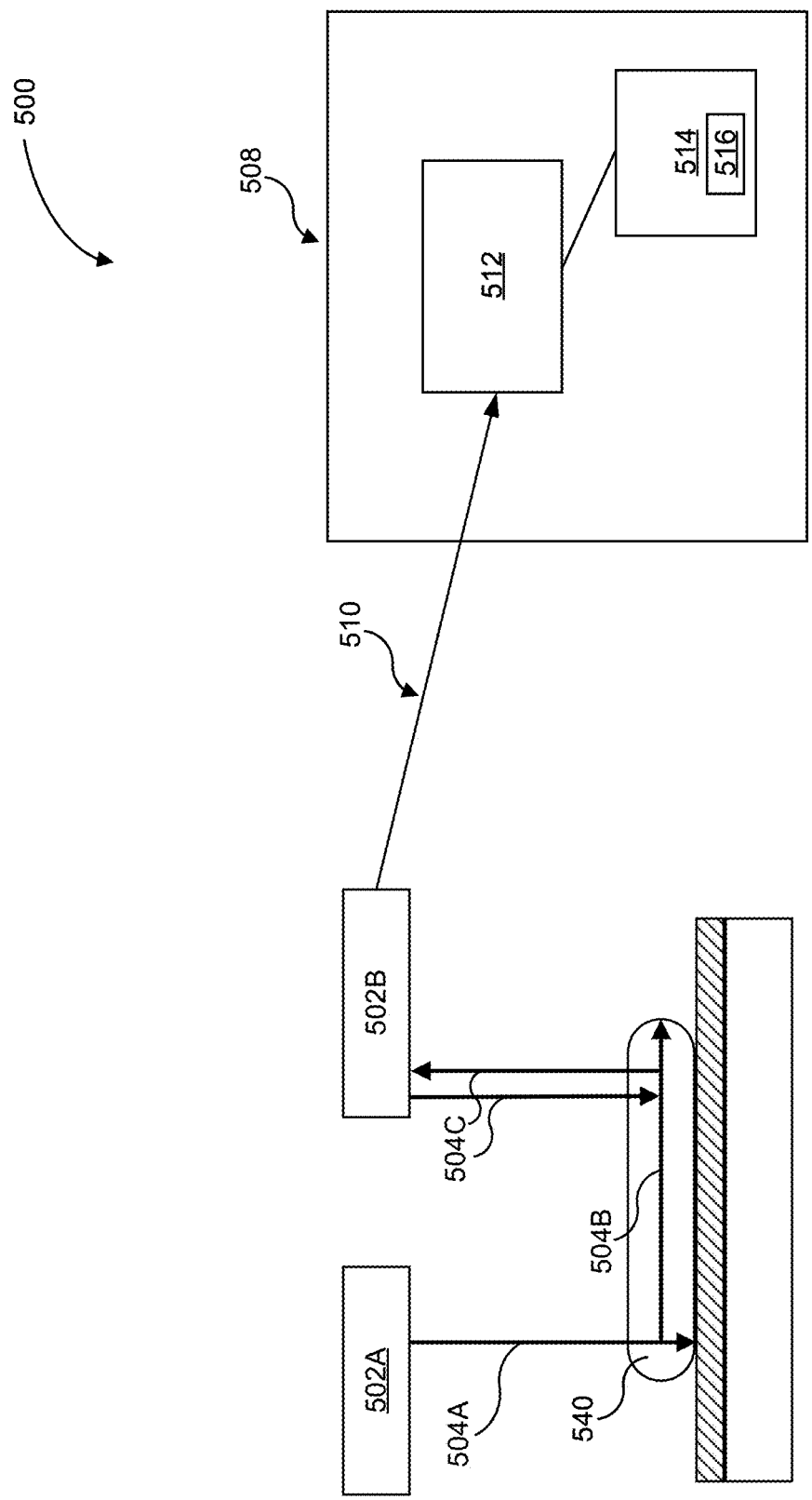
FIG. 17 depicts a system for determining one or more material properties of a material using ultrasound, according to non-limiting embodiments.

Described herein are systems and methods for determining one or more material properties of a material using ultrasound (such as a cell or tissue). Attention is directed to FIG. 17, which depicts example system 500 for determining one or more material properties of a material using ultrasound, according to non-limiting embodiments, and in which like or similar elements are denoted by like or similar numbers in FIGS. 1A to 1D and 2. For simplicity and ease of understanding, discussion of the systems and devices depicted in FIG. 17 will focus on certain similarities and differences from those depicted in FIGS. 1A to 1D and 2.

Example system 500 comprises at least two ultrasound transducers, a first ultrasound transducer 502A and a second ultrasound transducer 502B (collectively, ultrasound transducers 502, also referred to individually as ultrasound transducer 502A and ultrasound transducer 502B). Ultrasound transducer 502A is configured to emit a pushing wave (such as pushing wave 504A) that travels axially through a material or substrate, such as material 540, thereby generating one or more shear wave(s) (such as shear wave 504B) that travel laterally along the length of the material or substrate. Ultrasound transducer 502B is configured to acquire/detect and sample shear wave(s) 504B using rapid pulse ultrasound 504C to produce ultrasound signals representative of the one or more shear waves 504B (and/or data representative or indicative of the propagation of the one or more shear waves), such as ultrasound signal 510. Although two ultrasound transducers are depicted, it is understood that, according to some embodiments, system 500 comprises more than two ultrasound transducers. According to some embodiments, the ultrasound transducer emitting a pushing wave and the ultrasound transducer acquiring/detecting and sampling the shear wave(s) to produce the ultrasound signal may be separate components of the system for determining one or more material properties of a material. According to some embodiments, the ultrasound transducer emitting a pushing wave and the ultrasound transducer acquiring/detecting and sampling the shear wave(s) to produce the ultrasound signal may be combined into a single component of the system for determining one or more material properties of a material.

Similarly to systems 100 and 200, system 500 comprises ultrasound controller 508 having processor 512 and, according to some embodiments, memory 514 storing computer-executable instructions 516. Ultrasound controller 508 is configured to receive the acquired ultrasound signals (and/or data representative or indicative of the propagation of the one or more shear waves) from ultrasound transducer 502B. Processor 512 is configured to compute one or more relationships between the acquired ultrasound signals and/or data 510 and to analyze the one or more computed relationships to determine one or more material properties of the material 540. According to some embodiments, the one or more material properties may include, but is not limited to, one or more elastic properties, such as the shear modulus (G), Young's modulus (E), storage modulus, loss modulus, or another quantitative material property that is derived from these properties. An example of a derived quantitative material property is the complex modulus, which is a combination of the storage modulus and the loss modulus.

Detailed Example Embodiments

Provided below are descriptions of example embodiments of the described systems and methods. These examples are provided for illustrative purposes and to facilitate understanding of the described systems and methods. It is understood that these examples are not specifically limiting variations thereof and are within the scope of the claims appended hereto.

Cells

Primary adult cardiomyocytes were isolated by previously-established methods [15] from 8 week old CD1 male mice. Cells were plated onto tissue culture polystyrene or type I collagen-coated polyacrylamide gels with stiffness 11 kPa. Cells were induced to contract spontaneously in the microscope-mounted 37° C. incubator using sterile buffer containing (in mmol L-1) NaCl (130), KCl (5), NaH2PO4 (0.5), D-glucose (10), HEPES (10), taurine (10), MgSO4 (1), and CaCl2 (1.8), pH 7.8.

Ultrasound System

A custom ultrasound system was built to rapidly insonify and acquire/detect and process/sample ultrasound waves reflected from single CMs with high precision. An Intel i7 computer with a trigger card (Spincore, USA) was used to control the hardware. A pulse generator (Geozondas, Lithuania) generated monocycles pulses that were sent through an RF-switch (Mini-Circuits, USA) to a 200 MHz ultrasound transducer with a 0.5 mm focal length. Returning signals were amplified by a 30 dB amplifier (Miteq, USA) before digitization at about 10 GS/s with 14-bit resolution (Teledyne SP Devices, Sweden) (see the example embodiment depicted FIGS. 5E and 5F where the cells were insonified at 1000 pulses/second, where each sample is the average of a 50-pulse burst at about 500 kHz PRF and signals were digitized at 10 GS/s, 14-bit resolution). The 200 MHz transducer is immersed into the cell medium for measurements. Cells were insonified at about 100 to about 1000 pulses/sec, where each sample was the average of a about 1 to about 100-pulse burst operating at about 100 to about 1000 kHz PRF. The pulse burst was used to increase the SNR. A 3-axis stage (Thorlabs, USA) was mounted to an Olympus IX71 microscope stage to move the ultrasound transducer over each individual cell, under optical guidance (see, for example, FIGS. 1C, 1D which depict CMs being plated on a polyacrylamide gel within a 12 well plate). A total of about 5000 to about 10000 RF-lines (about 5 to about 10 s acquisition time) were then acquired with simultaneous optical video (see, for example, FIGS. 5A to 5D).

Figure 5B:
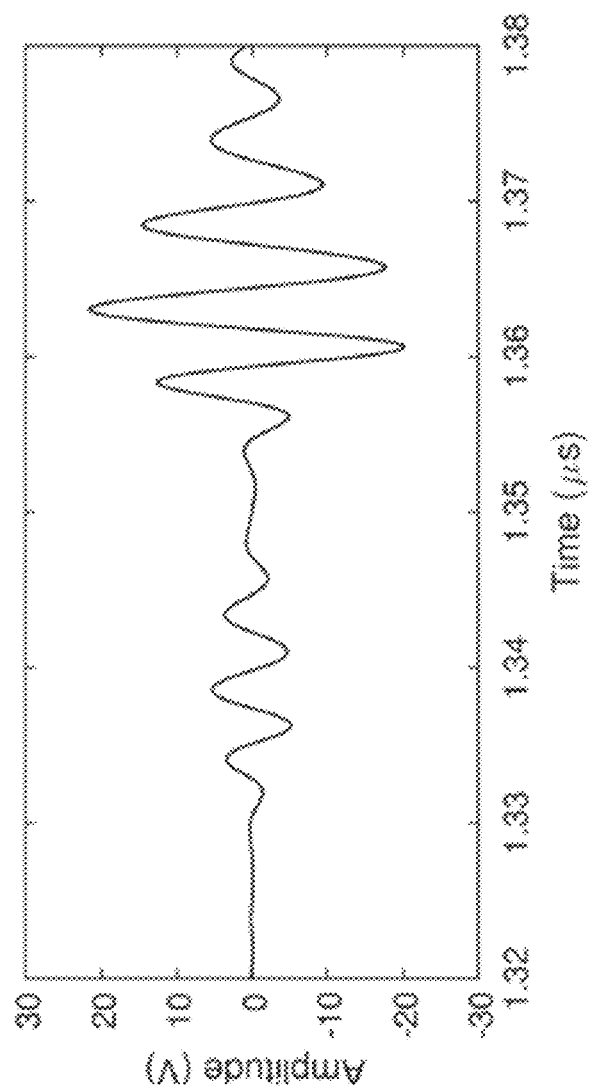
FIGS. 5A to 5G depict examples of ultrasound signals and optical images from a single CM, and changes in cell morphology, according to non-limiting embodiments.
Figure 5A:
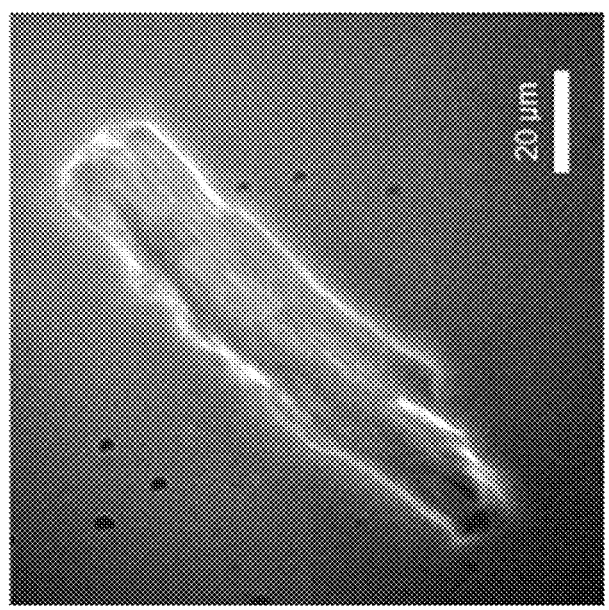
Figure 5D:
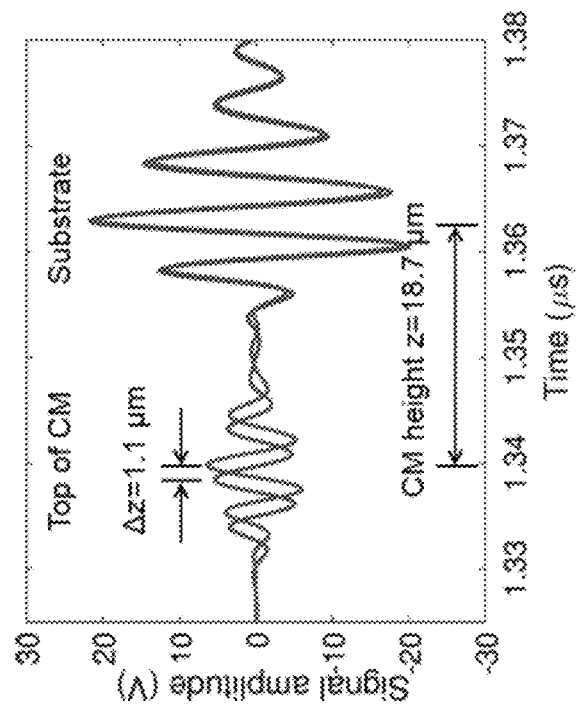
Figure 5C:
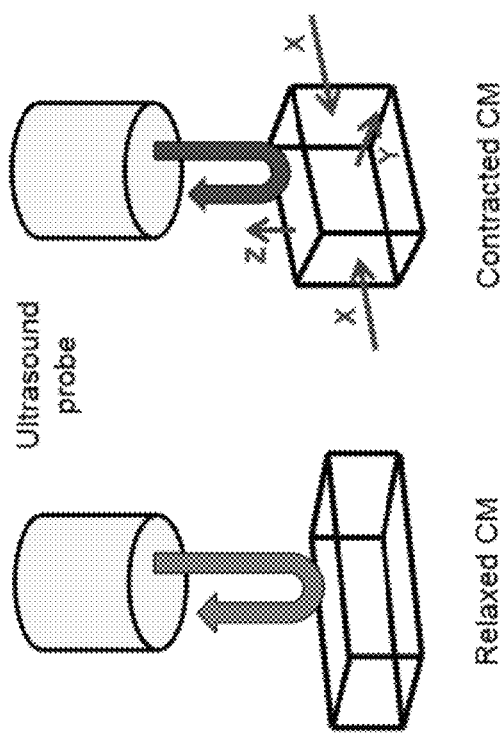
Figure 5F:
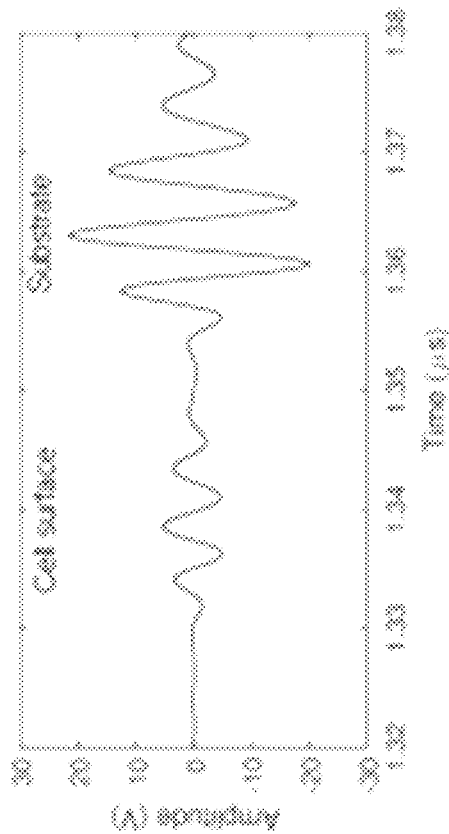
Figure 5E:
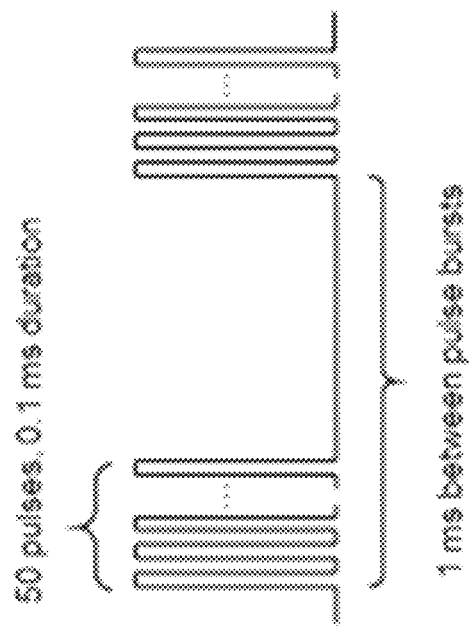

FIG. 5C depicts an example of the change in cellular morphology during contraction, and FIG. 5D depicts an example of the effect that the contraction has on the time of propagation of the ultrasound from which the cell height and change in cell height can be determined. As a cell contracts, it shortens along X, and expands along Y and Z according to Poisson's ratio. The change in cell height results in a change in propagation delay for the ultrasound echo from the cell surface.

Force Calculation Algorithm

The force of contraction was found by relating the change in height of the CM during each contraction (measured using ultrasound) to a force using an elastic model of the cell. The time of flight the ultrasound echo from the cell surface at relaxation was determined (e.g., 1.34 µs in FIG. 5D). The change in propagation time $\Delta t$ from this baseline is the change in cell height during each contraction, and was calculated for each acquired signal using the equation $$\Delta Z = \tfrac{1}{2} c \Delta t, \qquad (1)$$

where c is the sound speed in the liquid (1520 m/s for cell medium in this case). The axial strain $\varepsilon_z = \Delta Z/Z$ was calculated using the change in cell height $\Delta Z$ and the cell height Z, measured at relaxation. The transverse strain $\varepsilon_x$ in the direction of contraction was then calculated using Poisson's ratio $v = d\varepsilon_x/d\varepsilon_z$, where $v = 0.499$ for a nearly incompressible cell. The stress $\sigma_x$ and strain $\varepsilon_x$ are related through the Young's modulus E, where $$\sigma_x = E \varepsilon_x. \qquad (2)$$

This equation assumes that the CM is a homogeneous, isotropic, incompressible and elastic material. A Young's modulus of 40 kPa is typical for an adult CM [16] and was used in this study, but may also be measured using high frequency ultrasound elastography. The force exerted by the cell can then be calculated using $F = \sigma_x A$, where A is the area of the cell. The area can be obtained through optical imaging, or through acoustical imaging using the same ultrasound probe. These calculations were performed for every successive signal acquired, resulting in displacement and force measurements vs. time.

Validation Using Traction Force Microscopy

Fluorescent polystyrene microbeads 0.5 µm in diameter (Polysciences Inc, USA) were embedded in polyacrylamide gels with a stiffness of 11 kPa. Videos of beating CMs and the fluorescent beads were acquired at a framerate of 20 fps. The displacement field was measured using the motion of the fluorescent beads. An iterative particle image velocimetry (PIV) method was used, where the image was divided into increasingly smaller interrogation windows to determine the displacement vectors. The traction field was then calculated using the Fourier Transform Traction Cytometry (FTTC) method using ImageJ plugins [17], [18]. FTTC-determined stresses were integrated within the area of the cell to give a total cell force scalar, given the assumptions of uniaxial contraction and zero vector sum [19].

Results

Examples of the ultrasound signal and optical image from a single CM are shown in FIGS. 5A, 5B, 5D and 5F. The ultrasound echo from the CM surface (1.34 µs) and the substrate (1.363 µs) are separated in time and are easily resolved. As the CM contracts, it shortens along the length of contraction in the X-axis and expands along the Y- and Z-axes. The change in cell height causes a change in propagation time for the ultrasound echo from the cell surface. The signals at CM relaxation and peak contraction are shown in FIG. 5D. The ultrasound echo from the cell surface changes from 1.340 µs (at relaxation) to 1.3383 µs (fully contracted), while the signals from the substrate remains static. Simultaneous optical and ultrasound imaging demonstrated that the signal variations were directly correlated to the contractions observed optically.

Figure 5G:
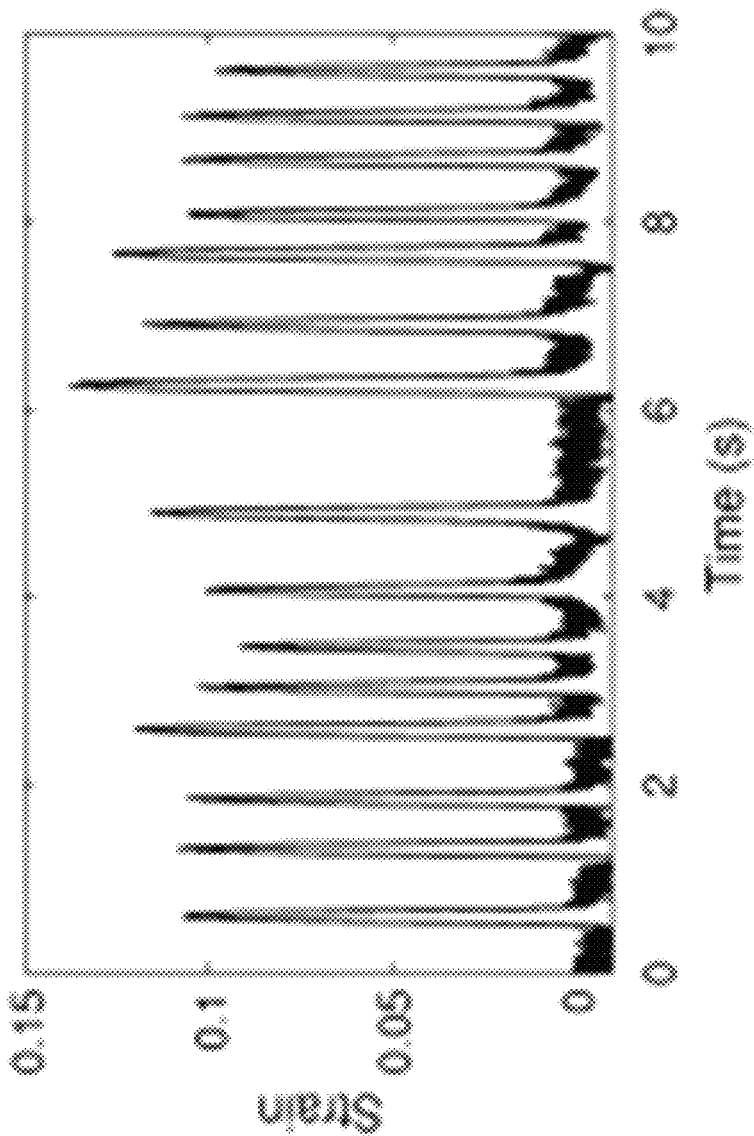
Figure 6A:
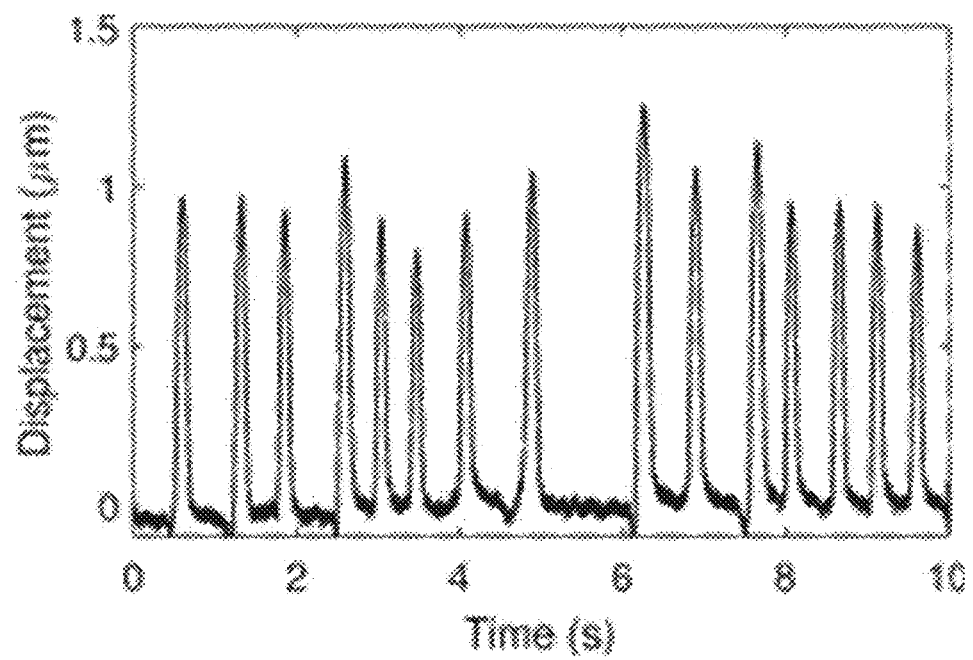
Figure 6B:
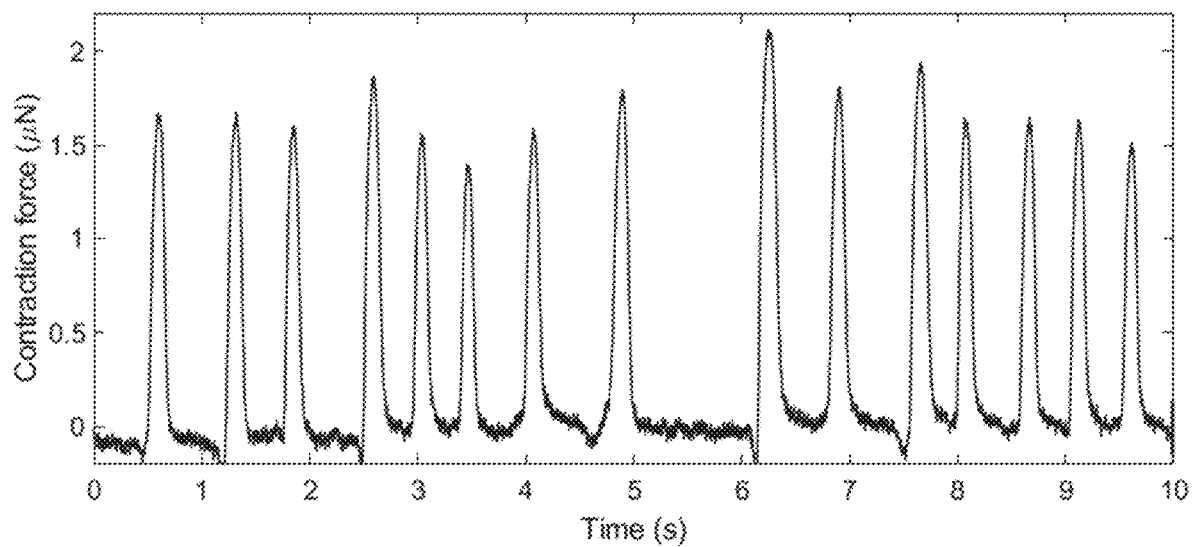
Figure 6G:
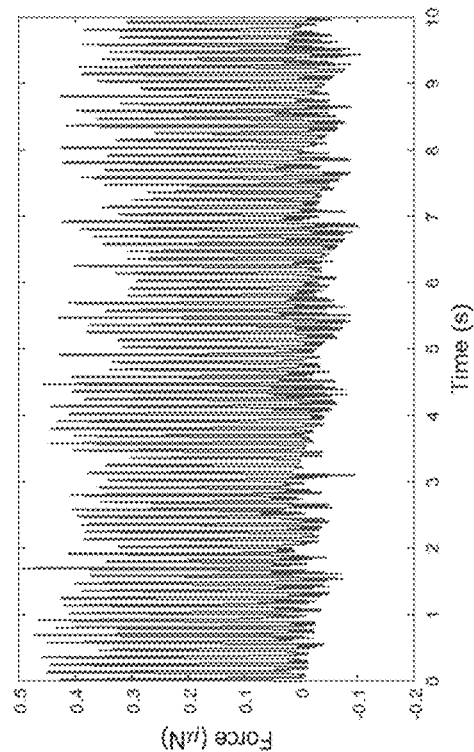
Figure 6F:
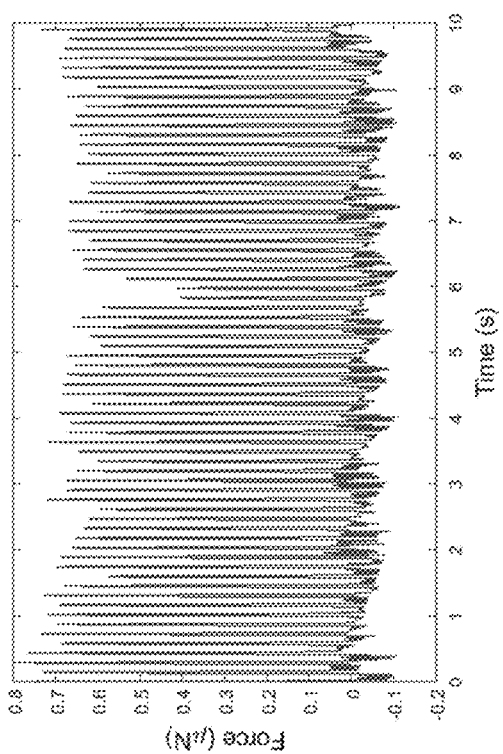
Figure 8B:
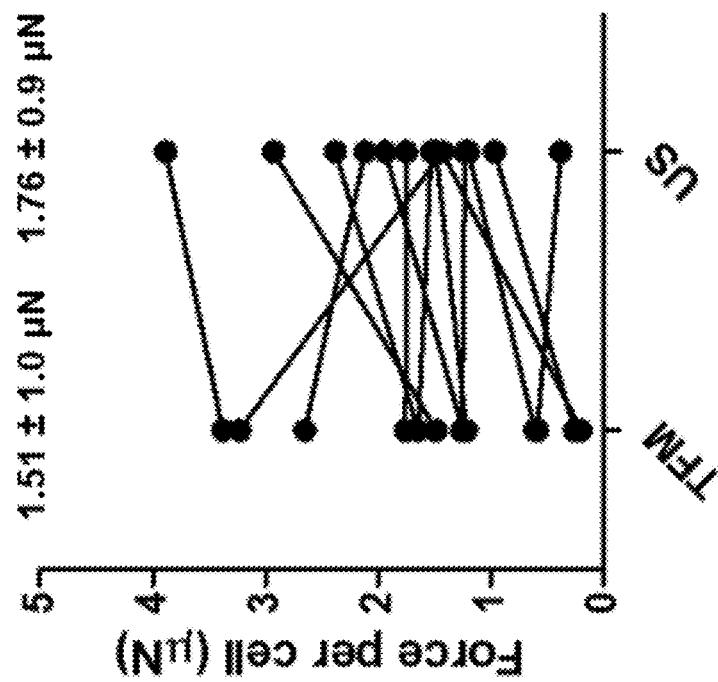
FIGS. 8A and 8B depict the force of contraction measured using ultrasound and traction force microscopy, according to non-limiting embodiments.
Figure 8A:
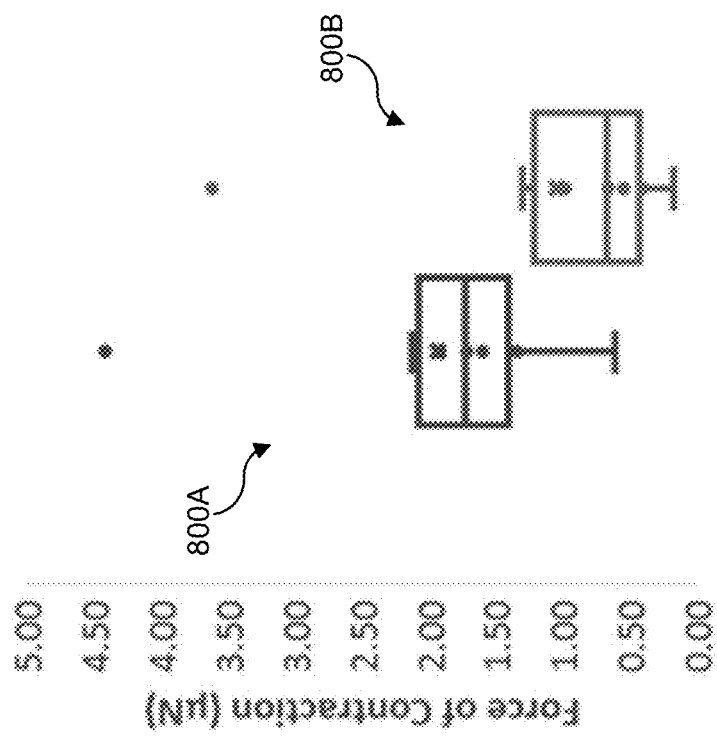

The change in cell height was calculated using equation (1) over a 10 s period (FIGS. 6A and 6B), where the cell height varied between about 0.8 µm to about 1.25 µm over 15 beats. From this displacement measurement, the beat rate of about 1.5 bps was determined. The axial strain $\varepsilon_z$ and transverse strain $\varepsilon_x$ were calculated (see, for example, FIG. 5G), and then the stress along the direction of travel was found using the stress-strain relation in equation (2). The area of the CM was measured from the optical image, and the force of contraction was then calculated (FIGS. 6A and 6B). The force of contraction for this single CM varied between 1.4 and 2.1 µN. This force calculation was repeated for 8 cells, for an average force of 1.93±1.0 µN per cell (FIGS. 8A and 8B; FIG. 8A depicts the force contraction measured using ultrasound, 800A, and traction force microscopy, 800B; FIG. 8B depicts the paired force contraction measured using ultrasound and traction force microscopy for 14 CMs). The elastic model in equation (2) operates under the assumption that the cell is incompressible, homogeneous, isotropic and elastic. Other models that take into account viscosity or other biomechanical properties not accounted for such as the Voigt model can also be used.

FIGS. 6C to 6G further illustrate the force contraction results of CM(s) according to non-limiting embodiments. In particular, FIGS. 6C to 6G depict the force profiles of a single adult CM paced at 1, 3, 5, 7 and 9 Hz, respectively.

Figure 7:
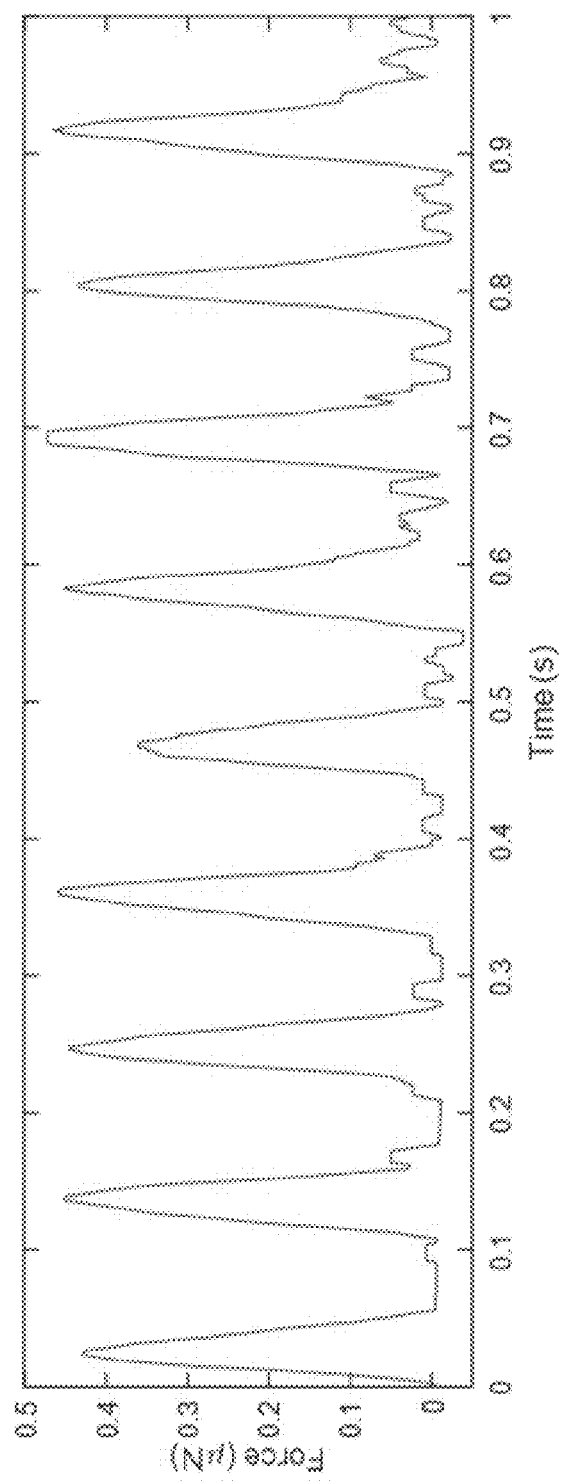
FIG. 7 depicts a 1 s sequence of an adult CM paced at 9 Hz, according to non-limiting embodiments.

FIG. 7 depicts a 1 s sequence of an adult CM paced at 9 Hz, according to non-limiting embodiments, demonstrating high temporal and spatial resolution.

Figure 13:
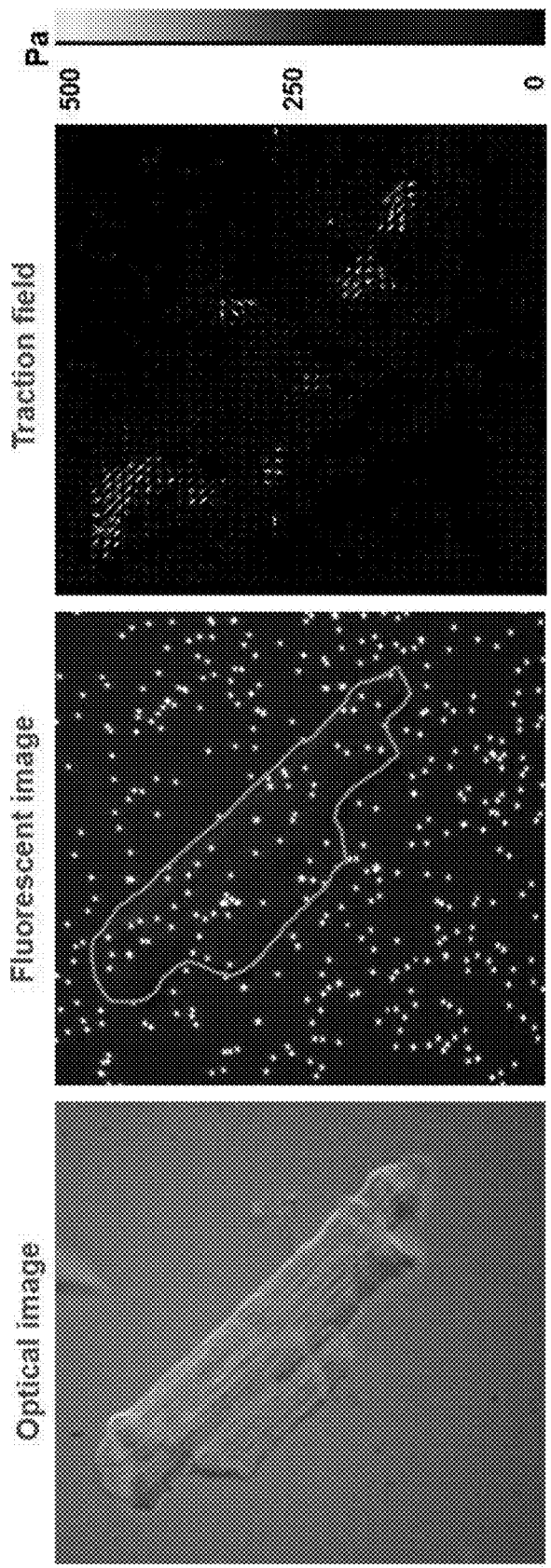
FIG. 13 depicts an optical image of a CM plated on polyacrylamide, fluorescent beads distributed throughout the polyacrylamide gel, and traction field from tracking the bead motion, according to non-limiting embodiments.

Traction force microscopy is currently the gold standard for determining the contraction force of single CMs. An optical image of a CM plated on polyacrylamide, 0.5 µm fluorescent beads distributed throughout the polyacrylamide gel, and traction field from tracking the bead motion is shown in FIG. 13. The traction field ranged from 0 Pa (black) to 500 Pa (white). The force of contraction of 8 different CMs was 1.1±1.0 µN (FIGS. 8A and 8B). These measurements are similar to those obtained using ultrasound and are also in agreement with other studies using adult CMs (0.5-10 µN) [20]-[24]. The results are summarized in Table I.

TABLE I

FORCE MEASUREMENTS OF SINGLE CARDIOMYOCYTES.

| Measurement Technique | Number of cells | Calculated force per cell |
| --- | --- | --- |
| Ultrasound | 8 | 1.93 ± 1.0 µN (0.6-4.4 µN) |
| Traction Force Microscopy | 8 | 1.1 ± 1.0 µN (0.2-3.6 µN) |

Figure 9:
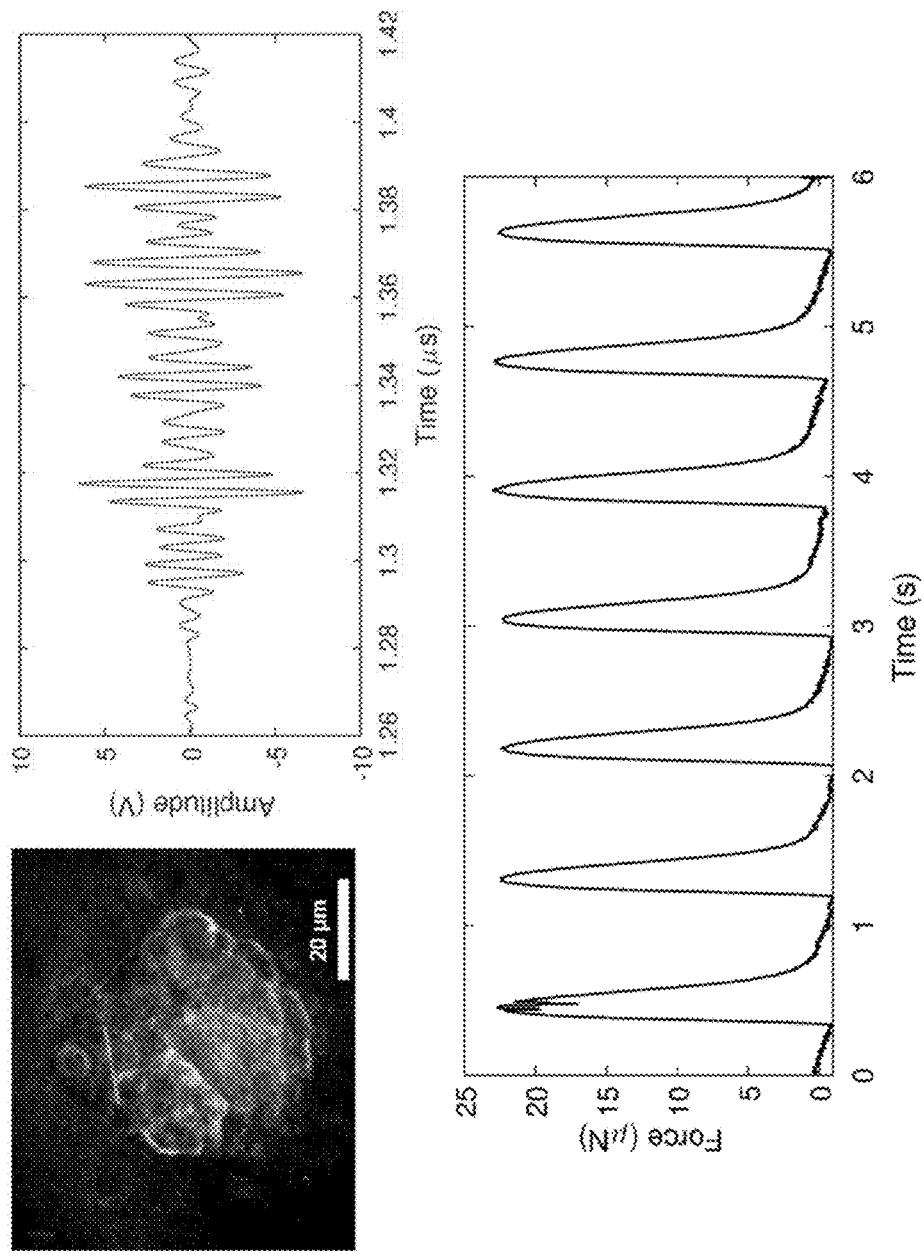
FIG. 9 depicts a representative ultrasound signal from a CM spheroid and the resulting force vs. time contraction profile, according to non-limiting embodiments.

FIG. 9 depicts a representative ultrasound signal from a CM spheroid (PSC-derived CMs about 50 to about 300 µm in diameter), and the resulting force vs. time contraction profile, according to non-limiting embodiments.

Figure 10:
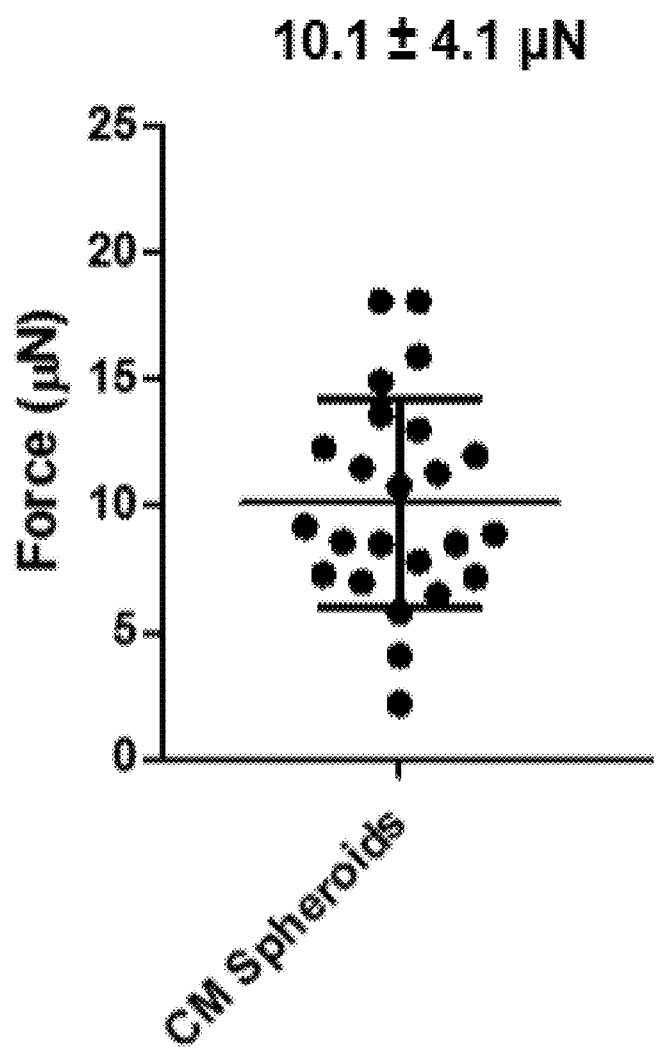
FIG. 10 depicts force calculations for 21 CM spheroids, according to non-limiting embodiments.

FIG. 10 depicts results of force calculations for 21 CM spheroids that were about 100 to about 200 µm in diameter, according to non-limiting embodiments.

According to at least some embodiments, the ultrasound system is usually non-invasive, label-free and highly versatile, and usually can be used on a variety of substrates ranging from glass, plastic and gels, as well as complex 2D and 3D microtissue platforms. By changing the ultrasound frequency, the resolution and field of view can be varied, and thus scale from measurements of single cells to 3D microtissues. Operating at 1000 samples/sec, the temporal resolution to monitor CM contractility is unprecedented, and may give new insights into the beat characteristics, particularly at high beat rates. The ultrasound contractility measurement is not limited to cardiomyocytes. Other cells or tissues that exhibit changes in shape due to contraction, resulting from internal or external stimulation, include other myocytes such as smooth muscle cells or tissue, skeletal muscle cells or tissue, and myofibroblasts, among others. Using appropriate ultrasound frequencies, changes in subcellular component, such as myofibrils within a single cell, can also be measured.

Ultrasound Shear Wave Elastography

Ultrasound shear wave elastography is a method to detect the propagation of travelling shear waves in a material. An ultrasound pushing transducer focused into the material creates a high amplitude pressure wave that travels longitudinally (along the direction of the transducer) through the material. For typical biological materials (e.g., tissues and gelatin phantoms), the speed of sound of this longitudinal pressure wave is about 1500 m/s. As the wave travels, it induces shear waves that travel transversely (perpendicular to the longitudinal wave). The sound speed of these shear waves in typical biological materials is about 0.5 to about 2 m/s, orders of magnitude slower than the longitudinal wave. Due to the slow speed of these shear waves, the wave propagation can be imaged using various techniques including ultrasound.

The speed of the waves is dependent on the elastic properties of the material. The longitudinal wave is dependent on the density and bulk modulus of the material, while the speed of the shear wave is dependent on the density and shear modulus of the material. The Young's modulus can be obtained from the shear modulus. A typical Young's modulus for CMs is 40 kPa [Lieber et al. (2004) Aging increases stiffness of cardiac myocytes measured by atomic force microscopy nanoindentation. *Am J Physiol Heart Circ Physiol* 287, H645-H651], but the shear modulus and Young's modulus of biological cells and soft tissues can vary widely between $10^0$ to $10^7$ Pa [Park et al. (2006) 1E-5 Synergy and Applications of Combined Ultrasound, Elasticity, and Photoacoustic Imaging. *IEEE Ultrasonics Symposium, pp.* 405-415], depending on the cell or tissue type, age, and disease vs. health status (e.g., cancer, fibrosis), and thus measurement of shear or Young's modulus can inform the type and state of a cell or tissue. In contrast, this is not possible by measuring the bulk modulus as it has limited dynamic range in only the $10^9$ Pa range due to the near incompressibility of cells and tissues.

There are many options available to image the shear wave. The ability to resolve changes in the Young's modulus mostly depends on the resolution of the imaging system. Supersonic Imagine™ is a clinical ultrasound shear wave imaging system with a resolution of mm to sub-mm range. Others have demonstrated research-based ultrasound devices using ultrasound frequencies of up to 40 MHz with resolution down to 100's of micrometers.

As discussed above, according to some embodiments, there is provided a method to image shear waves using ultrasound up to about 500 MHz, with resolution in the low µm range, such as between about 2 µm and about 8 This may provide the ability to determine the Young's modulus with better resolution than any other technique. Imaging a shear within a gelatin material is also possible, according to at least some embodiments. Imaging a shear can also be done at the single cell level. The systems and methods described herein may permit the performance of elastography techniques temporally faster and compared to other systems and methods, by, for example, increasing the frame rate to about 1 MHz or higher to better "see" the shear wave. Higher resolution is achieved, for example, due to the higher ultrasound frequency.

According to some embodiments, the systems and methods can be used to measure other material properties of a cell or tissues, including viscoelastic (time-dependent) properties. These other material properties may be measured and correlated to or predictive of other cell functions, including physical or biological. For example, cancer cell material properties can be correlated with their metastatic potential. The changes in elastic or viscoelastic properties can be measured on timescales that no one has used before in ultrasound (e.g., about 1 microsecond or less between signals).

Figure 11B:
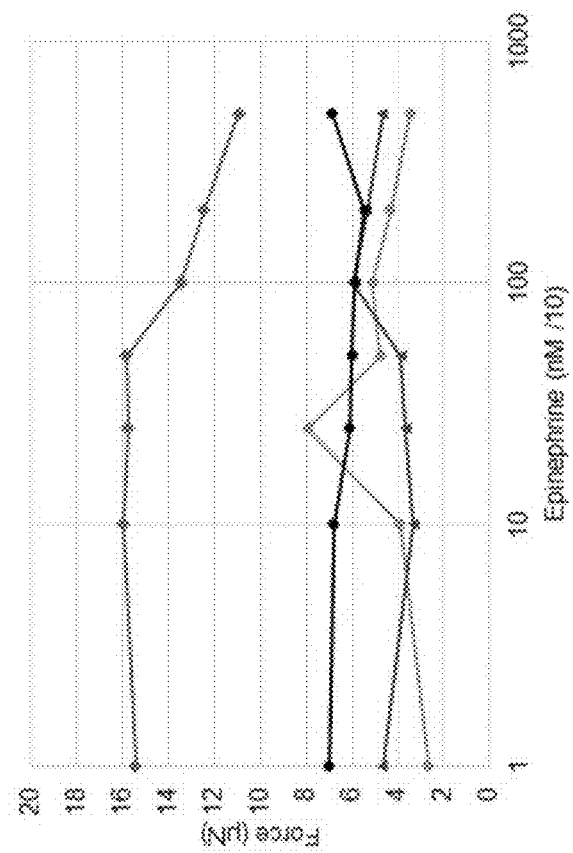
FIGS. 11A and 11B depict the effect of epinephrine on the beat rate and force of contraction for four CM spheroids, according to non-limiting embodiments.
Figure 11A:
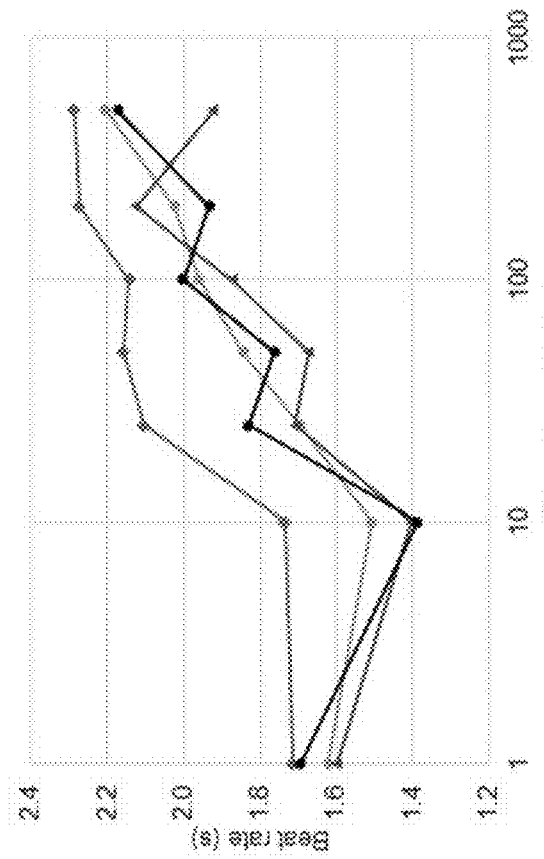
Figures 12A, 12B, 12C:
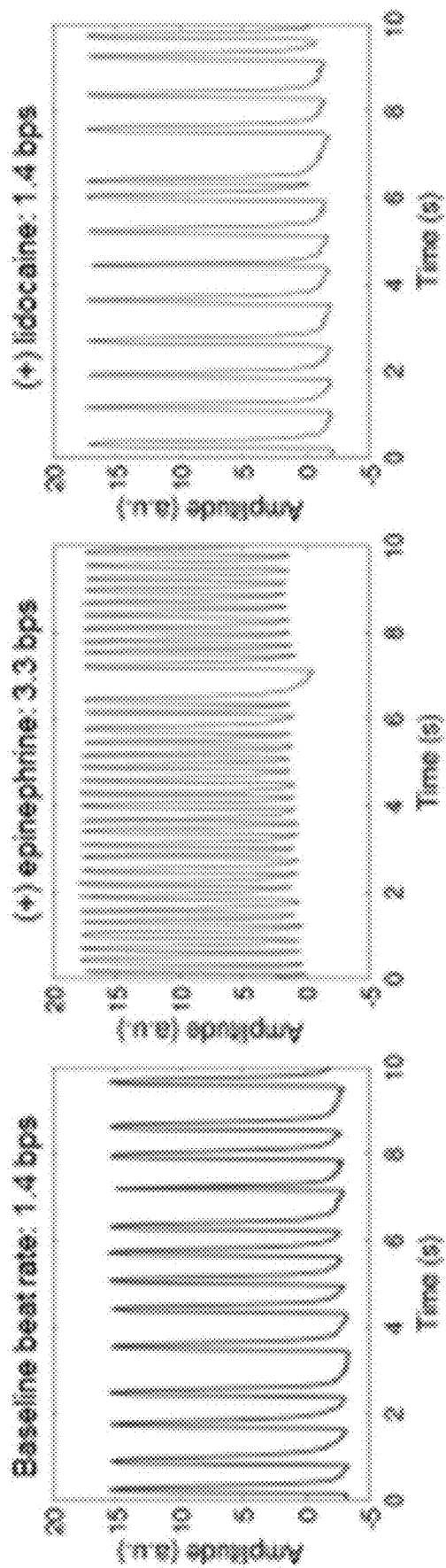
FIGS. 12A to 12C depict the effects of epinephrine and lidocaine on CMs, according to non-limiting embodiments.

According to some embodiments, the systems and methods described herein can be used to measure the effect of an agent, such a drug, on cell(s) or microtissue(s). FIGS. 11A and 11B depict the effect of epinephrine on the beat rate and force of contraction for four CM spheroids, according to non-limiting embodiments. FIGS. 12A to 12C depict the effect of epinephrine and lidocaine on spheroids composed of mouse neonatal CMs about 300 μm in diameter, according to non-limiting embodiments.

According to some embodiments, the shear wave imaging system and contractility measurement systems of the invention are combined in one system. Currently, the Young's modulus of a cell is determined using published literature values. Determining the Young's modulus in tandem with the contractility measurements would enable an all-in-one system, enabling more accurate determination of the force of contraction.

Technical Details

Figure 15:
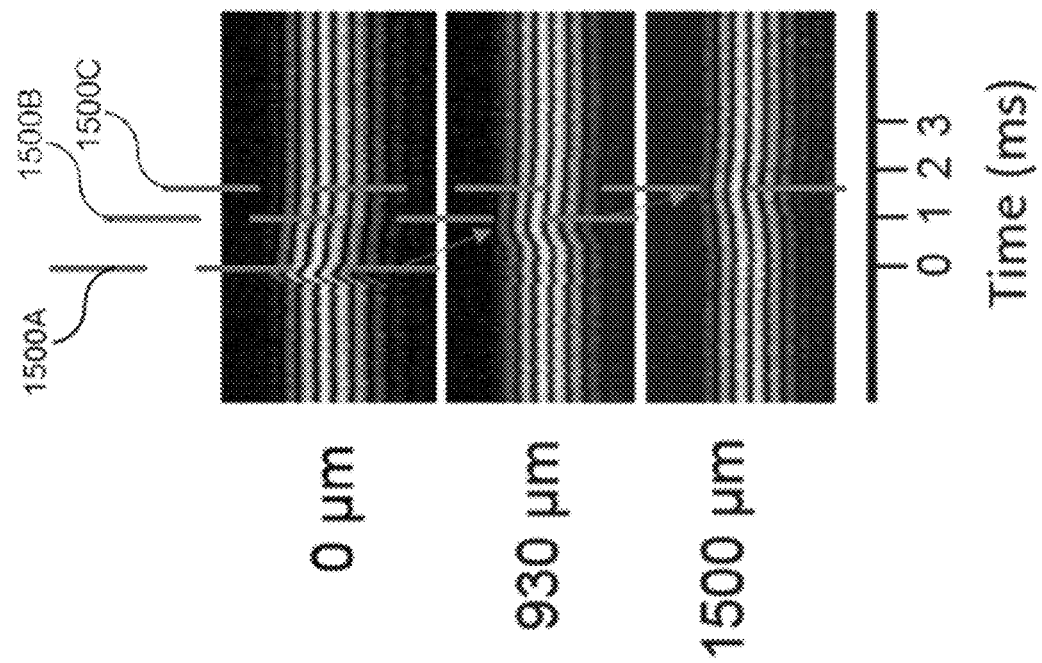
FIGS. 14 and 15 depict an ultrasound elastography imaging setup and the imaging of shear waves, according to non-limiting embodiments.
Figure 14:
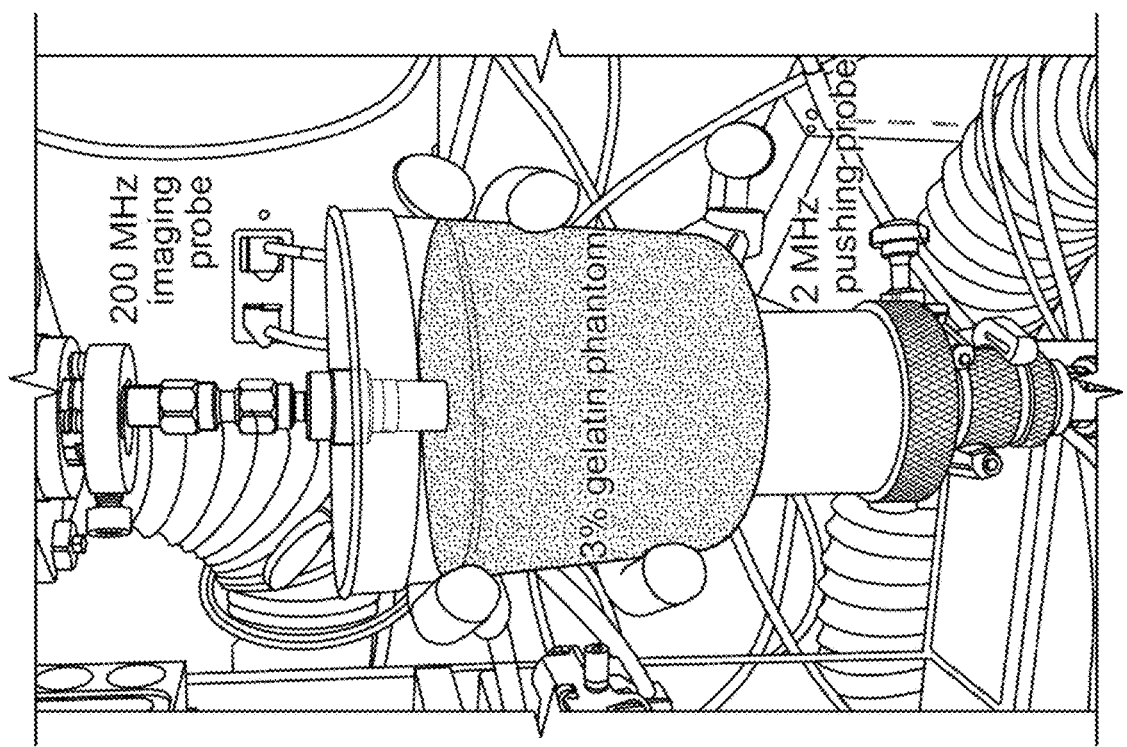

FIG. 14 shows a 200 MHz imaging transducer probe the gel surface from above with a 2 MHz ultrasound pushing transducer probe creating a pushing wave from the bottom. The 200 MHz imaging probe has a focal length of about 0.5 mm, while the 2 MHz ultrasound transducer has a focal length of about 4 cm, which is sufficient to travel from the bottom of the cup to the top. FIG. 15 shows three M-mode ultrasound images, where the 200 MHz imaging transducer is located at position 0 μm (directly over the focal spot of the 2 MHz ultrasound pushing transducer), 930 μm to the left of the 2 MHz focal spot, and then 1500 μm to the left of the 2 MHz focal spot. The "bump" (1500A, 1500B, 1500C) is the shear wave, it is an axial displacement in the gelatin material. The shear wave is imaged as it travels through the gelatin, and the farther the transducer is away from the 2 MHz focal spot, the longer it will take for it to travel. About 10,000 signals were recorded with the 200 MHz at about 500 kHz PRF for a total time of about 20 ms. The wave took about 1.8 ms to travel from about 0 to about 1500 μm, which gives a speed of 0.84 m/s, which is typical for a shear wave in gelatin. The resolution of this system was about 8 μm. Using higher frequencies enables higher resolution, up to about 1 μm at 1000 MHz.

It will be appreciated that ultrasound transducer 102 (and any other transducers described herein, such as transducers 202, 502A and 502B) may comprise one or more processors (not shown) as described herein, for carrying out functions of the transducer described herein (such as applicable blocks of the methods herein described, e.g., sampling the acquired/detected ultrasound wave(s) 104 reflected from the one or more contracting cell(s) or microtissue(s)).

Those skilled in the art will appreciate that in some embodiments, the functionality of the described systems and methods can be implemented using pre-programmed hardware or firmware elements (e.g., application specific integrated circuits (ASICs), electrically erasable programmable read-only memories (EEPROMs), etc.), or other related components. In other embodiments, the functionality of the described systems and methods can be achieved using a computing apparatus that has access to a code memory (not shown) which stores computer-readable program code for operation of the computing apparatus. The computer-readable program code could be stored on a computer readable storage medium which is fixed, tangible and readable directly by these components (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Although the disclosure has been described with reference to certain specific embodiments, various modifications thereof will be apparent to those skilled in the art. Any examples provided herein are included solely for the purpose of illustrating the disclosure and are not intended to limit the disclosure in any way. Any drawings provided herein are solely for the purpose of illustrating various embodiments of the disclosure and are not intended to be drawn to scale or to limit the disclosure in any way. The scope of the claims appended hereto should not be limited by the embodiments set forth in the above description, but should be given the broadest interpretation consistent with the present specification as a whole. The disclosures of all documents cited herein are incorporated herein by reference in their entirety.

LIST OF REFERENCES

Provided below is a list of documents referenced herein:

[1] D. Rajamohan et al., "Current status of drug screening and disease modelling in human pluripotent stem cells," Bioessays, vol. 35, no. 3, pp. 281-298, March 2013.

[2] K. H. Benam et al., "Engineered In Vitro Disease Models," Annual Review of Pathology: Mechanisms of Disease, vol. 10, no. 1, pp. 195-262, 2015.

[3] E. Tzatzalos, O. J. Abilez, P. Shukla, and J. C. Wu, "Engineered heart tissues and induced pluripotent stem cells: Macro- and microstructures for disease modeling, drug screening, and translational studies," Advanced Drug Delivery Reviews, vol. 96, pp. 234-244, January 2016.

[4] J. Liu, N. Sun, M. A. Bruce, J. C. Wu, and M. J. Butte, "Atomic Force Mechanobiology of Pluripotent Stem Cell-Derived Cardiomyocytes," PLoS ONE, vol. 7, no. 5, p. e37559, May 2012.

[5] A. Kajzar, C. M. Cesa, N. KirchgeBner, B. Hoffmann, and R. Merkel, "Toward Physiological Conditions for Cell Analyses: Forces of Heart Muscle Cells Suspended Between Elastic Micropillars," Biophysical Journal, vol. 94, no. 5, pp. 1854-1866, March 2008.

[6] K. Kim et al., "Calibrated micropost arrays for biomechanical characterisation of cardiomyocytes," IET Micro Nano Letters, vol. 6, no. 5, pp. 317-322, May 2011.

[7] M. L. Rodriguez, B. T. Graham, L. M. Pabon, S. J. Han, C. E. Murry, and N. J. Sniadecki, "Measuring the Contractile Forces of Human Induced Pluripotent Stem Cell-Derived Cardiomyocytes With Arrays of Microposts," J Biomech Eng, vol. 136, no. 5, pp. 051005-051005, April 2014.

[8] K. M. Beussman, M. L. Rodriguez, A. Leonard, N. Taparia, C. R. Thompson, and N. J. Sniadecki, "Micropost arrays for measuring stem cell-derived cardiomyocyte contractility," Methods, vol. 94, pp. 43-50, February 2016.

[9] A. Grosberg, A. P. Nesmith, J. A. Goss, M. D. Brigham, M. L. McCain, and K. K. Parker, "Muscle on a chip: In vitro contractility assays for smooth and striated muscle,"

Journal of Pharmacological and Toxicological Methods, vol. 65, no. 3, pp. 126-135, May 2012.

[10] A. W. Feinberg, A. Feigel, S. S. Shevkoplyas, S. Sheehy, G. M. Whitesides, and K. K. Parker, "Muscular Thin Films for Building Actuators and Powering Devices," Science, vol. 317, no. 5843, pp. 1366-1370, September 2007.

[11] S. P. Sheehy, F. Pasqualini, A. Grosberg, S. J. Park, Y. Aratyn-Schaus, and K. K. Parker, "Quality Metrics for Stem Cell-Derived Cardiac Myocytes," Stem Cell Reports, vol. 2, no. 3, pp. 282-294, March 2014.

[12] Y. Shafieyan, S. Hume, and B. Hinz, "Development of a novel device compatible with highthroughput imaging systems for automated analysis of cell contraction," in Gordon Research Conference: Tissue Repair and Regeneration, New London, NH, USA, 2015.

[13] I. Banerjee et al., "Cyclic stretch of embryonic cardiomyocytes increases proliferation, growth, and expression while repressing Tgf-β signaling," Journal of Molecular and Cellular Cardiology, vol. 79, pp. 133-144, February 2015.

[14] L. MacQueen, O. Chebotarev, C. A. Simmons, and Y. Sun, "Miniaturized platform with on-chip strain sensors for compression testing of arrayed materials," Lab Chip, vol. 12, no. 20, pp. 4178-4184, September 2012.

[15] M. Ackers-Johnson, P. Y. Li, A. P. Holmes, S.-M. O'Brien, D. Pavlovic, and R. S. Foo, "A Simplified, Langendorff-Free Method for Concomitant Isolation of Viable Cardiac Myocytes and Nonmyocytes From the Adult Mouse Heart Novelty and Significance," Circulation Research, vol. 119, no. 8, pp. 909-920, September 2016.

[16] J. G. Jacot, J. C. Martin, and D. L. Hunt, "Mechanobiology of Cardiomyocyte Development," J Biomech, vol. 43, no. 1, p. 93, January 2010.

[17] Q. Tseng et al., "Spatial organization of the extracellular matrix regulates cell-cell junction positioning," Proc. Natl. Acad. Sci. U.S.A., vol. 109, no. 5, pp. 1506-1511, January 2012.

[18] "Traction Force Microscopy—ImageJ plugins by Qingzong TSENG." [Online]. Available: https://sites.google.com/site/qingzongtseng/tfm. [Accessed: 14 Oct. 2018].

[19] A. J. S. Ribeiro et al., "Contractility of single cardiomyocytes differentiated from pluripotent stem cells depends on physiological shape and substrate stiffness," PNAS, vol. 112, no. 41, pp. 12705-12710, October 2015.

[20] G. Lin, R. E. Palmer, K. S. J. Pister, and K. P. Roos, "Miniature heart cell force transducer system implemented in MEMS technology," IEEE Transactions on Biomedical Engineering, vol. 48, no. 9, pp. 996-1006, September 2001.

[21] S.-I. Yasuda et al., "A novel method to study contraction characteristics of a single cardiac myocyte using carbon fibers," American Journal of Physiology—Heart and Circulatory Physiology, vol. 281, no. 3, pp. H1442-H1446, September 2001.

[22] S. Nishimura et al., "Single cell mechanics of rat cardiomyocytes under isometric, unloaded, and physiologically loaded conditions," American Journal of Physiology—Heart and Circulatory Physiology, vol. 287, no. 1, pp. H196-H202, July 2004.

[23] S. Yin, X. Zhang, C. Zhan, J. Wu, J. Xu, and J. Cheung, "Measuring Single Cardiac Myocyte Contractile Force via Moving a Magnetic Bead," Biophysical Journal, vol. 88, no. 2, pp. 1489-1495, February 2005.

[24] G. Tribe, M. Helmes, and P. Kohl, "Force-length relations in isolated intact cardiomyocytes subjected to dynamic changes in mechanical load," American Journal of Physiology—Heart and Circulatory Physiology, vol. 292, no. 3, pp. H1487-H1497, March 2007.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as "configured to" or "enabled to" perform one or more functions. Generally, it is understood that a component that is "configured to" or "enabled to" perform a function is configured to or enabled to perform the function, or is suitable for performing the function, or is adapted to perform the function, or is operable to perform the function, or is otherwise capable of performing the function.

Additionally, components in the present application may be described as "operatively connected to", "operatively coupled to", and the like, to other components. It is understood that such components are connected or coupled to each other in a manner to perform a certain function. It is also understood that "connecting", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to effect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A system for determining the contractile function of one or more contracting cells or a contracting microtissue using ultrasound, the system comprising: a transducer configured to detect ultrasound waves reflected from one or more contracting cells or the contracting microtissue, and sample said detected waves to produce ultrasound signals comprising: a first signal amplitude representing an upper surface of the one or more contracting cells or of the contracting microtissue when the one or more contracting cells or the contracting microtissue is in a rest state; a second signal amplitude representing a lower surface of the one or more contracting cells or of the contracting microtissue when the one or more contracting cells or the contracting microtissue is in the rest state; a third signal amplitude representing the upper surface of the one or more contracting cells or of the contracting microtissue when the one or more contracting cells or the contracting microtissue is in a contraction state; and a fourth signal amplitude representing the lower surface of the one or more contracting cells or of the contracting microtissue when the one or more contracting cells or the contracting microtissue is in the contraction state; and an ultrasound controller configured to receive the ultrasound signals from the transducer, the ultrasound controller comprising a processor configured to:
compute one or more relationships between the signals, wherein the one or more relationships comprise at least one of: acquired signal amplitude, acquired signal phase, propagation delay, and time of flight;
analyze the one or more computed relationships to determine the contractile function of the one or more contracting cells or the contracting microtissue;
determine a rest height by determining a difference between the first signal amplitude and the second signal amplitude;
determine a contraction height by determining a difference between the third signal amplitude and the fourth signal amplitude; and
determine a contraction distance by determining between the rest height and the contraction height;
wherein the transducer is also configured to emit ultrasound energy to the one or more contracting cells or the contracting microtissue, and wherein the system further comprises a switch configured to switch the transducer between emitting the ultrasound energy and detecting the reflected waves; and wherein the transducer is further configured to emit ultrasound energy at a frequency of between about 20 MHz and about 500 MHz.

2. The system of claim 1, wherein the transducer is further configured to insonify the one or more contracting cells or the contracting microtissue at a pulse repetition rate that is faster than the rate of contraction of the cell or microtissue and/or wherein the transducer is further configured to insonify the one or more contracting cells or the contracting microtissue at a minimum of: (a) about 100 pulses per second, or (b) about 500 pulses per second or (c) about 1000 pulses per second.

3. The system of claim 1, wherein each said sample is of:
a single pulse;
between about 10 and about 100 pulse bursts; or
an average of a 50-pulse burst at a pulse repetition frequency of 500 kHz.

4. The system of claim 1, wherein the transducer is further configured to sample the detected ultrasound waves to produce the ultrasound signals at a minimum of between about: (a) 1 and about 50 gigasamples per second, or (b) between about 1 and 10 gigasamples per second.

5. The system of claim 1, wherein the processor is further configured to perform one or more of the following:
determine the axial displacement of the one or more contracting cells or the contracting microtissue from the one or more computed relationships;
determine the rate of change of deformation of the one or more contracting cells or the contracting microtissue from the one or more computed relationships;
determine the beat rate of the one or more contracting cells or the contracting microtissue from the one or more computed relationships;
determine the beat rhythm of the one or more contracting cells or the contracting microtissue from the one or more computed relationships; and
determine the contractile force of the one or more contracting cells or the contracting microtissue from the one or more computed relationships.

6. The system of claim 1, further comprising a stage configured to secure a receptacle containing the one or more contracting cells or the contracting microtissue, wherein the transducer is secured to the stage.

7. The system of claim 6, wherein the receptacle is a tissue culture well plate.

8. The system of claim 6, wherein the transducer is configured to detect the reflected ultrasound waves from above the one or more contracting cells or the contracting microtissue and, optionally, through a cover portion of the receptacle.

9. The system of claim 6, wherein the transducer is configured to detect the reflected ultrasound waves from below the one or more contracting cells or the contracting microtissue and through at least part of the receptacle.

10. The system of claim 1, wherein the transducer is configured to be in indirect contact with the one or more contracting cells or the contracting microtissue via a liquid medium.

11. The system of claim 1, wherein the one or more contracting cells is a myocyte or a cardiomyocyte.

12. The system of claim 11, wherein the cardiomyocyte is a primary cardiomyocyte, a stem cell-derived cardiomyocyte, an embryonic stem cell-derived cardiomyocyte or an induced pluripotent stem cell-derived cardiomyocyte.

13. The system of claim 1, wherein
at least some of said detected waves are reflected from a substrate;
the second signal amplitude is produced by sampling the detected waves reflected from the substrate; and
the fourth signal amplitude is produced by sampling the detected waves reflected from the substrate.

14. A method of determining the contractile function of one or more contracting cells or a contracting microtissue using ultrasound, the method comprising:
emitting, using a transducer, ultrasound energy to the one or more contracting cells or the contracting microtissue at a frequency of between about 20 MHz and about 500 MHz;
detecting, through the transducer, ultrasound waves reflected from the one or more contracting cells or the contracting microtissue;
sampling, by the transducer, said detected waves to produce ultrasound signals comprising: a first signal amplitude representing an upper surface of the one or more contracting cells or of the contracting microtissue when the one or more contracting cells or the contracting microtissue is in a rest state; a second signal amplitude representing a lower surface of the one or more contracting cells or of the contracting microtissue when the one or more contracting cells or the contracting microtissue is in the rest state; a third signal amplitude representing the upper surface of the one or more contracting cells or of the contracting microtissue when the one or more contracting cells or the contracting microtissue is in a contraction state; and a fourth signal amplitude representing the lower surface of the one or more contracting cells or of the contracting microtissue when the one or more contracting cells or the contracting microtissue is in the contraction state;
receiving the signals from the transducer at an ultrasound controller;
computing with a processor one or more relationships between the signals wherein the one or more relationships comprise at least one of: acquired signal amplitude;
acquired signal phase; propagation delay; and, time of flight;
analyzing, by the processor, the one or more computed relationships to determine the contractile function of the one or more contracting cells or the contracting microtissue;
determining a rest height by determining a difference between the first signal amplitude and the second signal amplitude;
determining a contraction height by determining a difference between the third signal amplitude and the fourth signal amplitude; and
determining a contraction distance by determining a difference between the rest height and the contraction height.

15. The method of claim 14, wherein at least some of said detected waves are reflected from a substrate; the second signal amplitude is produced by sampling the detected waves reflected from the substrate; and the fourth signal amplitude is produced by sampling the detected waves reflected from the substrate.

16. A method of measuring the effect an agent has on the contractile function of one or more contracting cells or a contracting microtissue using ultrasound, the method comprising:
emitting, using a transducer, ultrasound energy to the one or more contracting cells or the contracting microtissue at a frequency of between about 20 MHz and about 500 MHz;
detecting, through the transducer, ultrasound waves reflected from the one or more contracting cells or the contracting microtissue contacted with an agent;
sampling, by the transducer, said detected waves to produce ultrasound signals comprising: a first signal amplitude representing an upper surface of the one or more contracting cells or of the contracting microtissue in the absence of contact with the agent when the one or more contracting cells or the contracting microtissue is in a rest state; a second signal amplitude representing a lower surface of the one or more contracting cells or of the contracting microtissue in the absence of contact with the agent when the one or more contracting cells or the contracting microtissue is in the rest state; a third signal amplitude representing the upper surface of the one or more contracting cells or of the contracting microtissue in the absence of contact with the agent when the one or more contracting cells or the contracting microtissue is in a contraction state; a fourth signal amplitude representing the lower surface of the one or more contracting cells or of the contracting microtissue in the absence of contact with the agent when the one or more contracting cells or the contracting microtissue is in the contraction state; a fifth signal amplitude representing the upper surface of the one or more contracting cells or of the contracting microtissue contacted with the agent when the one or more contracting cells or the contracting microtissue is in the rest state; a sixth signal amplitude representing the lower surface of the one or more contracting cells or of the contracting microtissue contacted with the agent when the one or more contracting cells or the contracting microtissue is in the rest state; a seventh signal amplitude representing the upper surface of the one or more contracting cells or of the contracting microtissue contacted with the agent when the one or more contracting cells or the contracting microtissue is in the contraction state;
and an eighth signal amplitude representing the lower surface of the one or more contracting cells or of the contracting microtissue contacted with the agent when the one or more contracting cells or the contracting microtissue is in the contraction state;
receiving the signals from the transducer at an ultrasound controller;
computing with a processor one or more relationships between the signals wherein the one or more relationships comprise at least one of: acquired signal amplitude;
acquired signal phase; propagation delay; and, time of flight;
analyzing, by the processor, the one or more computed relationship to determine the contractile function of the one or more contracting cells or the contracting microtissue contacted with the agent;
comparing the contractile function of the one or more contracting cells or the contracting microtissue with the contractile function of the one or more contracting cells or the contracting microtissue in the absence of contact with the agent;
determining an absence rest height by determining a difference between the first signal amplitude and the second signal amplitude;

determining an absence contraction height by determining a difference between the third signal amplitude and the fourth signal amplitude;

determining an absence contraction distance by determining a difference between the absence rest height and the absence contraction height;

determining a contact rest height by determining a difference between the fifth signal amplitude and the sixth signal amplitude;

determining a contact contraction height by determining a difference between the seventh signal amplitude and the eighth signal amplitude;

determining a contact contraction distance by determining a difference between the contact rest height and the contact contraction height; and comparing the absence contraction distance with the contact contraction distance.

17. The method of claim 16, wherein at least some of said detected waves are reflected from a substrate; the second signal amplitude is produced by sampling the detected waves reflected from the substrate; the fourth signal amplitude is produced by sampling the detected waves reflected from the substrate; the sixth signal amplitude is produced by sampling the detected waves reflected from the substrate; and the eighth signal amplitude is produced by sampling the detected waves reflected from the substrate.

18. The method of claim 17, wherein the second signal amplitude is equal to the fourth signal amplitude and the sixth signal amplitude is equal to the eighth signal amplitude.

* * * * *